United States Patent
Yun et al.

(10) Patent No.: US 6,931,170 B2
(45) Date of Patent: *Aug. 16, 2005

(54) FIBER-ATTACHED OPTICAL DEVICES WITH IN-PLANE MICROMACHINED MIRRORS

(75) Inventors: Chang-Han Yun, Boston, MA (US); Shanti Bhattacharya, Chennai (IN); Yakov Reznichenko, Newton, MA (US); John R. Martin, Foxborough, MA (US); Lawrence E. Felton, Hopkinton, MA (US); Jeffrey Swift, Andover, MA (US); Kieran P. Harney, Andover, MA (US); Michael W. Judy, Wakefield, MA (US)

(73) Assignee: Analog Devices, Inc., Norwood, MA (US)

( * ) Notice: Subject to any disclaimer, the term of this patent is extended or adjusted under 35 U.S.C. 154(b) by 214 days.

This patent is subject to a terminal disclaimer.

(21) Appl. No.: 10/274,496

(22) Filed: Oct. 18, 2002

(65) Prior Publication Data

US 2004/0076366 A1 Apr. 22, 2004

(51) Int. Cl.$^7$ .............................. G02B 6/26; G02B 6/42
(52) U.S. Cl. .......................................... 385/18; 385/47
(58) Field of Search ...................... 385/15–19, 24–25, 385/33–35, 31, 47, 140; 359/291, 295, 223–224, 212, 214

(56) References Cited

U.S. PATENT DOCUMENTS

| | | | | |
|---|---|---|---|---|
| 5,500,912 A | * | 3/1996 | Alonas et al. | 385/37 |
| 6,253,001 B1 | | 6/2001 | Hoen | 385/17 |
| 6,347,167 B1 | * | 2/2002 | Hagelin | 385/18 |
| 6,374,007 B1 | * | 4/2002 | Hagelin et al. | 385/17 |
| 6,396,973 B1 | * | 5/2002 | Hagelin et al. | 385/17 |
| 6,430,330 B1 | * | 8/2002 | Hagelin | 385/17 |
| 6,430,331 B1 | * | 8/2002 | Hagelin et al. | 385/17 |
| 6,526,197 B2 | * | 2/2003 | Zhang | 385/18 |
| 6,531,767 B2 | * | 3/2003 | Shrauger | 257/678 |
| 6,549,692 B1 | * | 4/2003 | Harel et al. | 385/18 |
| 6,618,519 B2 | * | 9/2003 | Chang et al. | 385/18 |
| 6,625,345 B2 | * | 9/2003 | Reznichenko | 385/18 |
| 6,628,856 B1 | * | 9/2003 | Costello et al. | 385/18 |
| 6,631,222 B1 | * | 10/2003 | Wagener et al. | 385/16 |
| 6,640,023 B2 | * | 10/2003 | Miller et al. | 385/17 |
| 6,678,437 B2 | * | 1/2004 | Qian et al. | 385/18 |
| 6,701,038 B2 | * | 3/2004 | Rensing et al. | 385/18 |
| 6,707,959 B2 | * | 3/2004 | Ducellier et al. | 385/17 |
| 6,842,556 B2 | * | 1/2005 | Reznichenko | 385/18 |
| 2001/0033707 A1 | * | 10/2001 | Patel | 385/16 |
| 2002/0034355 A1 | * | 3/2002 | Hagelin et al. | 385/17 |
| 2002/0075551 A1 | * | 6/2002 | Daneman et al. | 359/254 |
| 2002/0076138 A1 | * | 6/2002 | Tew | 385/18 |
| 2002/0106145 A1 | * | 8/2002 | Lee et al. | 385/18 |
| 2002/0122619 A1 | * | 9/2002 | Sandler et al. | 385/17 |

(Continued)

FOREIGN PATENT DOCUMENTS

WO   WO 01/71809   9/2001   ........... H01L/29/00

*Primary Examiner*—Karl D. Frech
*Assistant Examiner*—Daniel Walsh
(74) *Attorney, Agent, or Firm*—Bromberg & Sunstein LLP

(57) ABSTRACT

A fiber-attached optical device with in-plane micromachined mirrors includes a cover having at least one reflector formed on one side and a substrate having a plurality of micromachined optical mirrors formed substantially on a single plane on a side facing toward the mirrored side of the cover. The micromachined optical mirrors are controllable to reflect optical signals between a plurality of optical fiber segments via the at least one reflector. The plurality of optical fiber segments can be attached to either the cover or the substrate so as to form an integrated package including the substrate, the cover, and the plurality of optical fiber segments. The mirrors can be controlled to variably attenuate the optical signals.

13 Claims, 23 Drawing Sheets

U.S. PATENT DOCUMENTS

| | | | |
|---|---|---|---|
| 2002/0126949 A1 * | 9/2002 | Welsh et al. | 385/18 |
| 2002/0141689 A1 * | 10/2002 | Qian et al. | 385/18 |
| 2002/0164110 A1 * | 11/2002 | Neukemans et al. | 385/18 |
| 2002/0186918 A1 * | 12/2002 | Burroughs | 385/18 |
| 2003/0012486 A1 * | 1/2003 | Ducellier et al. | 385/17 |
| 2003/0012489 A1 * | 1/2003 | Oikawa | 385/18 |
| 2003/0012509 A1 * | 1/2003 | Chang et al. | 385/50 |
| 2003/0021527 A1 * | 1/2003 | Mitamura et al. | 385/27 |
| 2003/0059153 A1 * | 3/2003 | Miller et al. | 385/17 |
| 2003/0133646 A1 * | 7/2003 | Reznichenko | 385/18 |
| 2003/0174935 A1 * | 9/2003 | Miller et al. | 385/24 |
| 2003/0210852 A1 * | 11/2003 | Chen et al. | 385/18 |
| 2004/0013342 A1 * | 1/2004 | Lucero | 385/16 |
| 2004/0022482 A1 * | 2/2004 | Blair et al. | 385/18 |
| 2004/0028320 A1 * | 2/2004 | Schroeder et al. | 385/18 |
| 2004/0047547 A1 * | 3/2004 | Reznichenko | 385/18 |
| 2004/0057658 A1 * | 3/2004 | Chu et al. | 385/18 |
| 2004/0076366 A1 * | 4/2004 | Yun et al. | 385/18 |
| 2004/0091200 A1 * | 5/2004 | Ikegame | 385/18 |
| 2004/0105616 A1 * | 6/2004 | Kazama et al. | 385/18 |
| 2004/0131306 A1 * | 7/2004 | Dejima et al. | 385/18 |
| 2004/0165828 A1 * | 8/2004 | Capewell et al. | 385/47 |

* cited by examiner

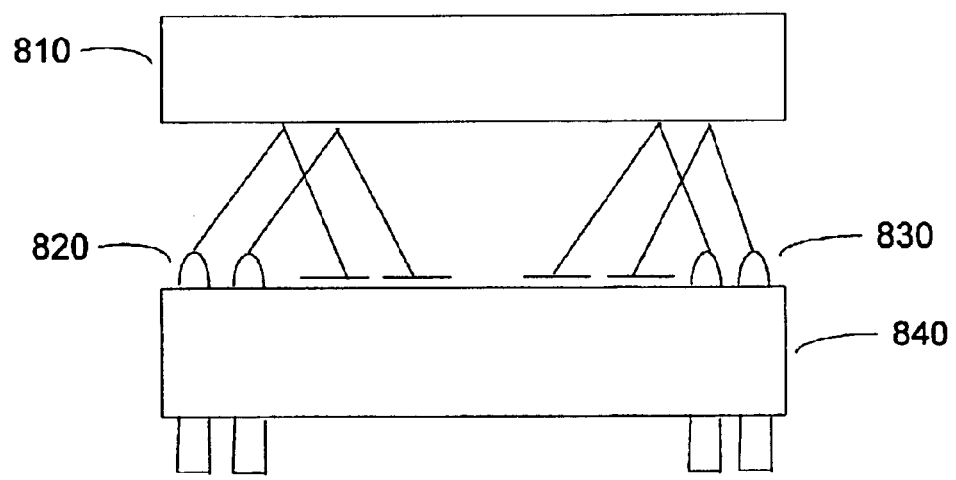
FIG. 8    800
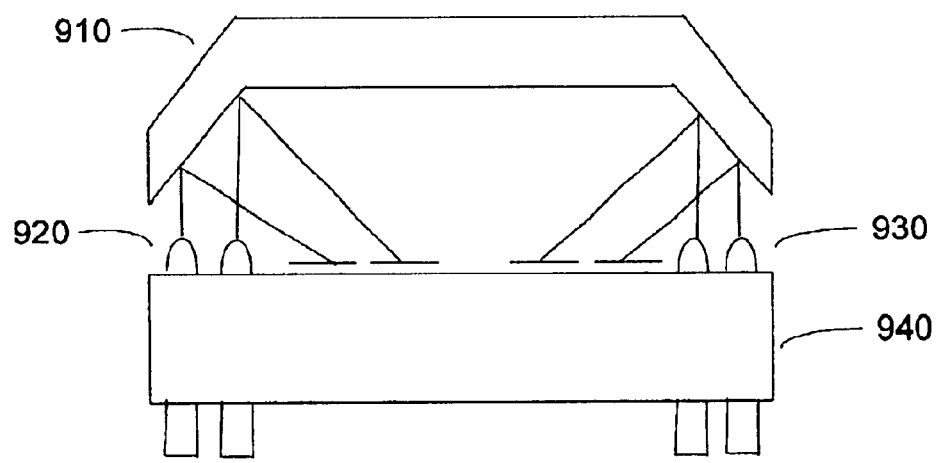
FIG. 9    900

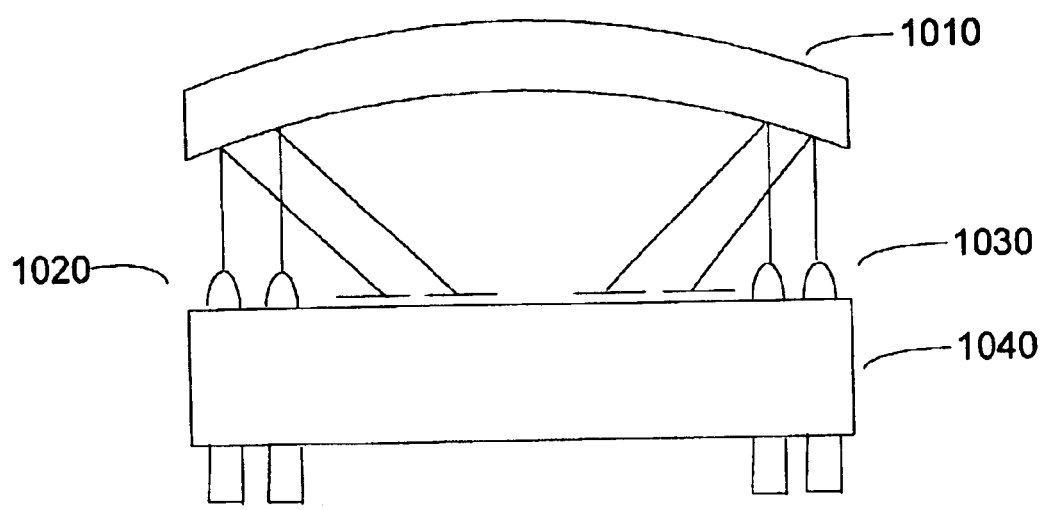
FIG. 10    1000

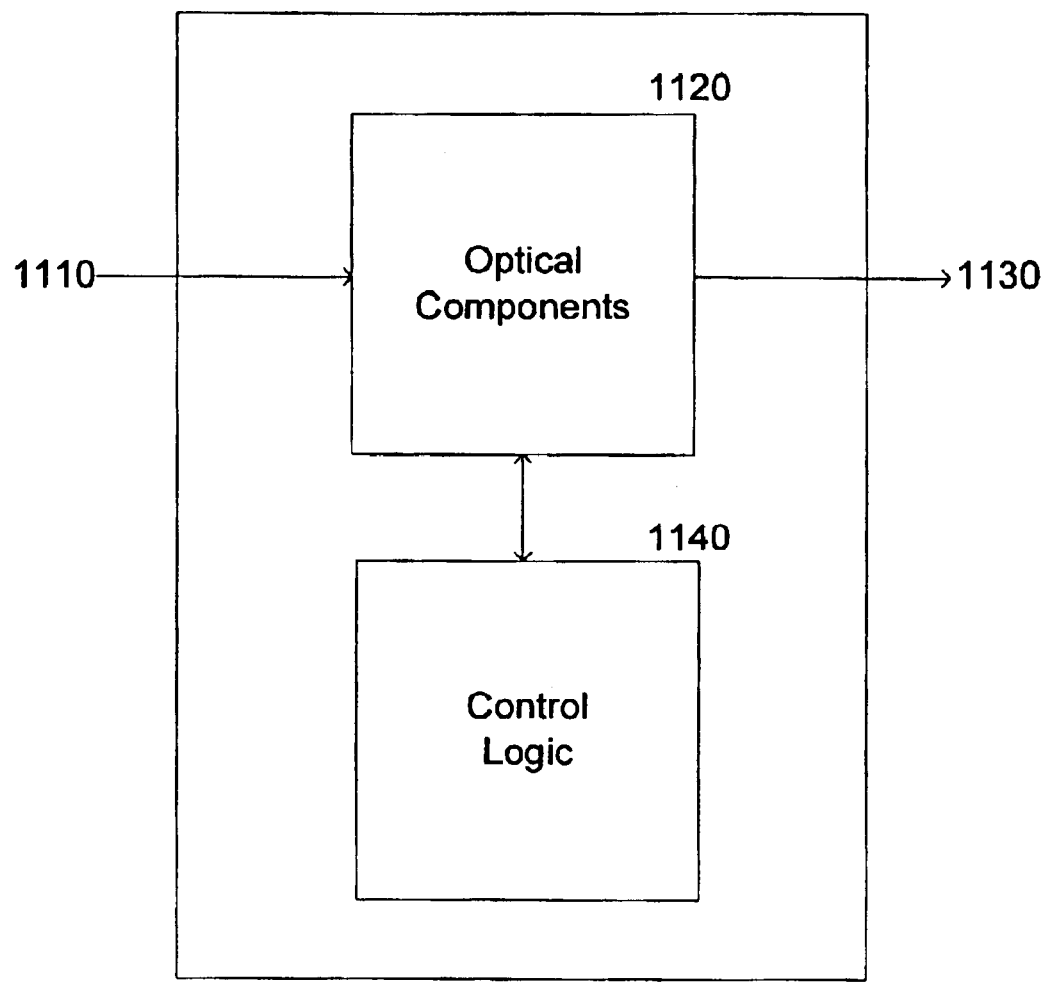
FIG. 11    1100

Top view
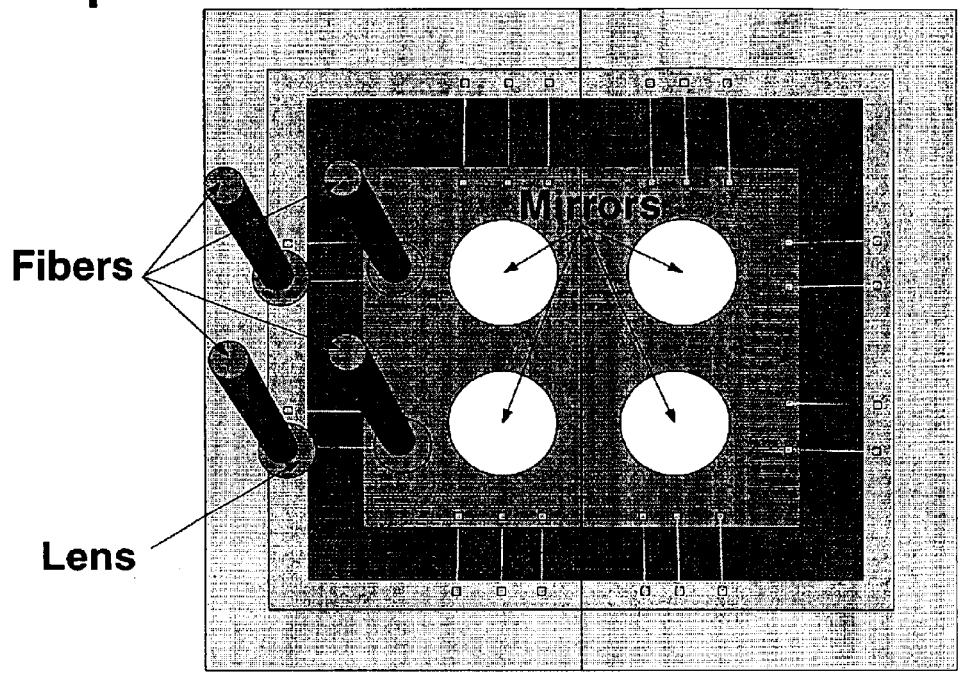
Fibers
Lens
1710
Side view
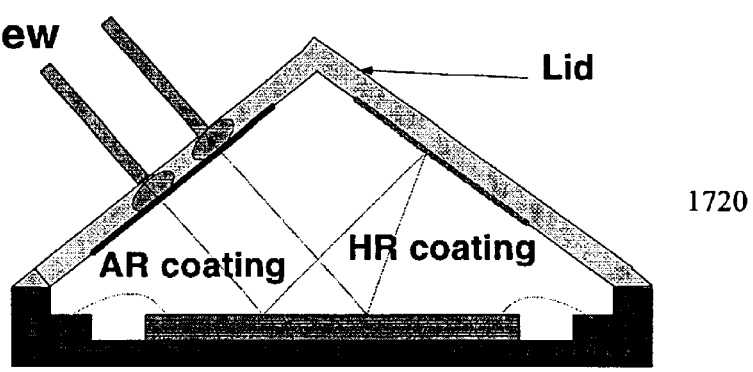
Lid
AR coating   HR coating
1720
FIG. 17   1700

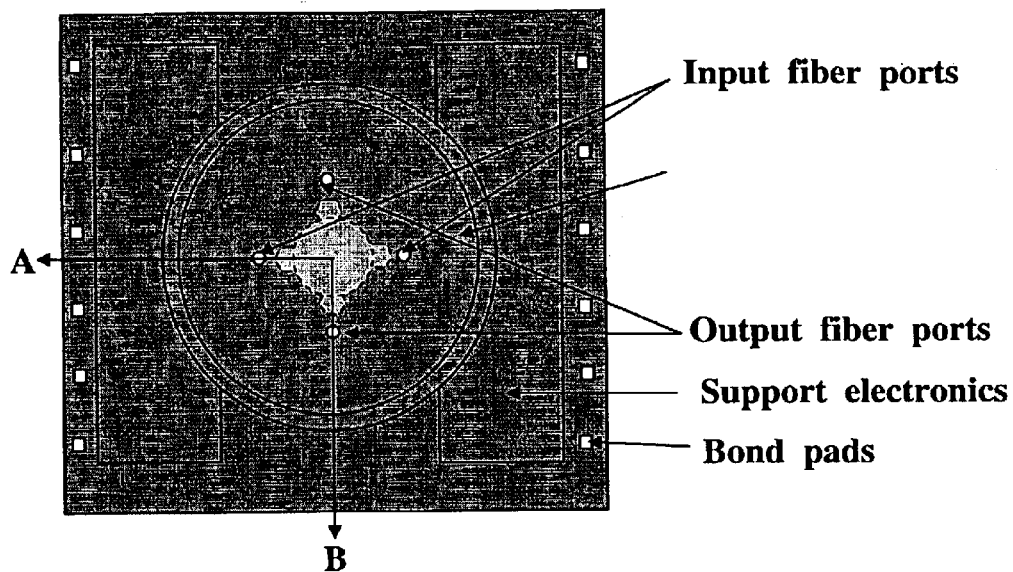
Input fiber ports
Output fiber ports
Support electronics
Bond pads
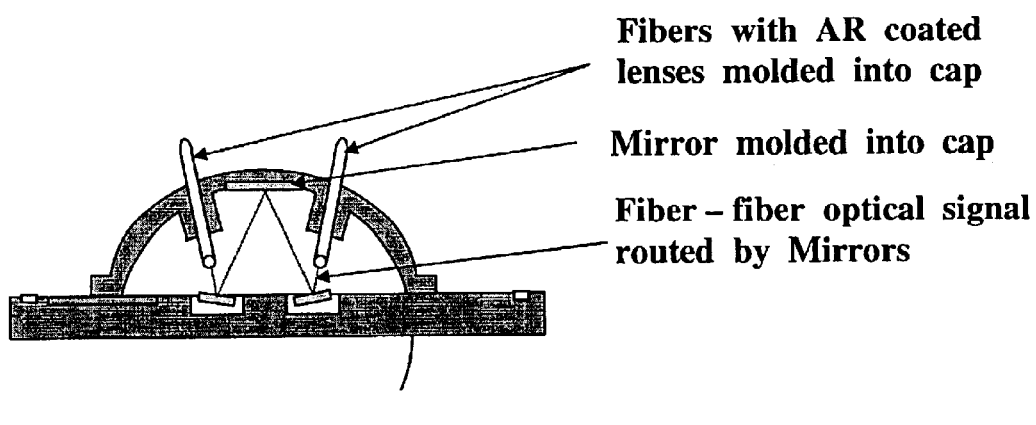
Fibers with AR coated lenses molded into cap
Mirror molded into cap
Fiber – fiber optical signal routed by Mirrors
FIG. 23

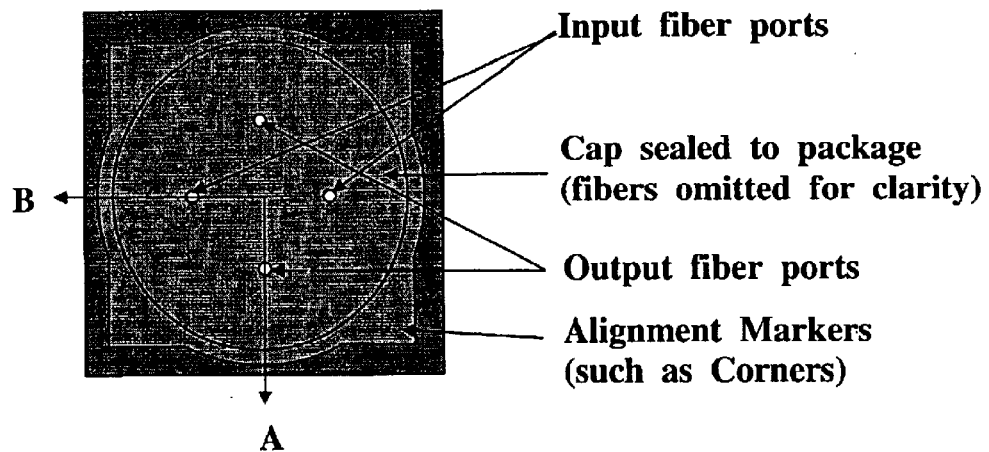
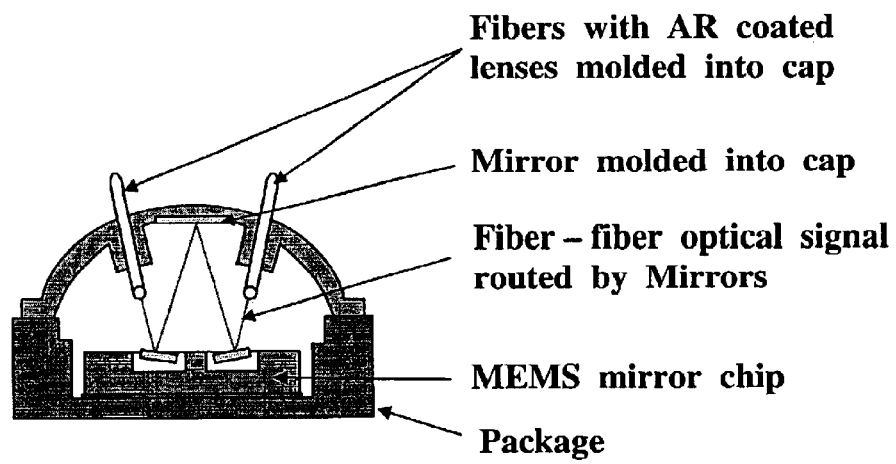
FIG. 25

FIBER-ATTACHED OPTICAL DEVICES WITH IN-PLANE MICROMACHINED MIRRORS

FIELD OF THE INVENTION

The present invention relates generally to micromachined optical devices, and more particularly to fiber-attached optical devices with in-plane micromachined mirrors.

BACKGROUND OF THE INVENTION

An optical switch is used to switch optical signals between a number of optical inputs and a number of optical outputs.

An optical switch can be formed using two arrays of micro-machined mirrors, which are often referred to as Micro Electromechanical System (MEMS) arrays. Each MEMS array typically includes N mirrors. The MEMS arrays are typically positioned opposite each other. Such an optical switch is generally capable of switching optical signals from any of N input fibers to any of N output fibers.

In order to switch an optical signal from a selected input fiber to a selected output fiber, the optical signal is directed from the selected input fiber to a selected mirror on one MEMS array, which reflects the optical signal to a selected mirror on the other MEMS array, which reflects the optical signal toward the selected output fiber. Input fiber collimators are used to direct optical signals from the input fibers to the first MEMS array. Output fiber collimators are used to direct optical signals from the second MEMS array to the output fibers.

Such optical switches are typically complex and expensive. This is due in part to the cost and complexity of the fiber collimators and MEMS arrays that make up the optical switch.

SUMMARY OF THE INVENTION

In accordance with one aspect of the invention, a fiber-attached optical device with in-plane micromachined mirrors includes a cover having at least one reflector formed on one side and a substrate having a plurality of micromachined optical mirrors formed substantially on a single plane on a side facing toward the mirrored side of the cover. The micromachined optical mirrors are controllable to reflect optical signals between a plurality of optical fiber segments via the at least one reflector. The plurality of optical fiber segments can be attached to either the cover or the substrate so as to form an integrated package including the substrate, the cover, and the plurality of optical fiber segments. The mirrors can be controlled to variably attenuate the optical signals.

The optical fiber segments may be attached using a fiber fusion technique, an adhesive bonding technique, a drilling and attachment technique, a soldering technique, or a glass frit technique. In some embodiments of the invention, the cover is plastic and the optical fiber segments are molded into the cover. In some embodiments of the invention, the cover is metal and each optical fiber segment penetrates through the cover. Each optical fiber segment may have a collimating lens attached to its tip. The tip of each optical fiber segment may be shaped to provide collimation. Collimating lenses, such as one or more microlens arrays, may be integrated into the cover or the substrate, in which case the optical fiber segments are attached in such a way that they align respectively with the collimating lenses. The substrate may include integrated electronics. The integrated package may be hermetically sealed.

In accordance with another aspect of the invention, a method for assembling an optical switching apparatus having a metal cap with an integral microlens array involves forming holes in the metal cap, forming a mirror on a front side of the microlens array, bonding the microlens array to the metal cap with the lenses aligned to the holes, bonding the metal cap with microlens array to a substrate having a plurality of micromachined optical mirrors, and mounting a plurality of optical fiber segments respectively into the holes. Bonding the microlens array to the metal cap with the lenses aligned to the holes may involve metallizing a back side of the microlens array to produce a solderable surface and soldering the back side of the microlens array to the metal cap with the lenses aligned to the holes. The method may also involve attaching strain relief to the capped substrate to reduce strain on the plurality of optical fiber segments during use of the optical switching apparatus.

In accordance with another aspect of the invention, an optical switching system includes a substrate having a surface including a first plurality of movable mirrors and a second plurality of movable mirrors and a cover having at least one reflector, a plurality of input fiber collimators, and a plurality of output fiber collimators, wherein optical signals are directed from the plurality of input fiber collimators to the first plurality of movable mirrors, from the first plurality of movable mirrors to the second plurality of movable mirrors via the at least one reflector, and from the second plurality of movable mirrors to the plurality of output fiber collimators via the plurality of output fiber collimators. Each input fiber collimator is typically positioned to direct an optical signal to a predetermine one of the first plurality of movable mirrors. Each mirror of the first plurality of mirrors is typically positioned relative to the at least one reflector and to the second plurality of mirrors so as to direct an optical signal to a selected mirror of the second plurality of mirrors via the at least one reflector. Each output fiber collimator is typically positioned so as to receive the optical signal from a predetermined one of the second plurality of mirrors. The cover may be substantially flat, and the plurality of input fiber collimators and the plurality of output fiber collimators may be positioned substantially perpendicular to a plane of the first and second plurality of movable mirrors. The cover may be substantially flat, and the plurality of input fiber collimators and the plurality of output fiber collimators may be positioned at an angle to a plane of the first and second plurality of movable mirrors. The cover may be shaped like an inverted "V," and the plurality of input fiber collimators and the plurality of output fiber collimators may be positioned at an angle to a plane of the first and second plurality of movable mirrors. The cover may be shaped like a four-sided pyramid, and the plurality of input fiber collimators and the plurality of output fiber collimators may be positioned substantially perpendicular to a plane of the first and second plurality of movable mirrors. The movable mirrors are typically controllable electronically. The optical switching system may include control logic for determining a desired position for each movable mirror and generating control signals for setting each movable mirror to its desired position. In one embodiment of the invention, there are two input fiber collimators, four movable mirrors and two output fiber collimators.

BRIEF DESCRIPTION OF THE DRAWINGS

In the accompanying drawings:

FIG. 8 is a block diagram showing an exemplary optical switch in which the incoming and outgoing optical signals are directed in part by setting the input and output lenses at an appropriate angle relative to a flat mirrored cover in accordance with an embodiment of the present invention;

FIG. 9 is a block diagram showing an exemplary optical switch in which the incoming and outgoing optical signals are directed in part by setting the ends of the mirrored cover at an appropriate angle in accordance with an embodiment of the present invention;

FIG. 10 is a block diagram showing an exemplary optical switch in which the incoming and outgoing optical signals are directed in part using a curved mirrored cover in accordance with an embodiment of the present invention;

FIG. 11 is a block diagram showing the relevant components of an exemplary optical switch in accordance with an embodiment of the present invention;

FIG. 17 shows a second exemplary design for a 2×2 optical switch having optical fiber collimators formed in the MEMS cover and optical fibers attached to the MEMS cover in accordance with an embodiment of the present invention;

FIG. 23 shows top and cross-sectional views of an exemplary 2×2 optical switch having the plastic cap and integrated fiber pigtails of FIG. 22A bonded to an optical MEMS device in accordance with an embodiment of the present invention;

FIG. 25 shows top and cross-sectional views of an exemplary 2×2 optical switch having an optical MEMS device in a ceramic package with the plastic cap and integrated fiber pigtails of FIG. 22A in accordance with an embodiment of the present invention;

DETAILED DESCRIPTION OF A PREFERRED EMBODIMENT

In an embodiment of the present invention, an optical switching device includes a substrate having movable micromachined mirrors formed in-plane thereon and a cover having at least one fixed reflector (mirror) formed thereon. Collimating optics can be formed integral to either the substrate or the cover, depending on implementation. The collimating optics are configured so as to direct optical signals to and from the various reflectors/mirrors for optical switching from a number of input fibers to a number of output fibers. The fixed reflectors (mirrors) are configured so as to reflect optical signals between movable micromachined mirrors depending upon the positions of the movable micromachined mirrors. Optical fibers carrying optical signals to and from the optical switching device are attached to optical switching device in such as way that optical signals can be directed to and from the various mirrors through the collimating optics.

One advantage of such an optical switching device is that movable micromachined mirrors need only be formed on one substrate, as opposed to free-space optical switches that use two MEMS arrays.

Another advantage of such an optical switching device is that the entire switch, including optical input and output fibers, is contained within a single device. This reduces the overall free-space optical path length and therefore reduces optical loss.

Another advantage of such an optical switching device is that, by attaching the fibers directly to the optical switching device, the optical switching device with optical fibers can be hermetically sealed.

Another advantage of such an optical switching device is that, by attaching the input and output fibers to the same side of the optical switching device, 2×2×N optical switches can be formed by placing N 2×2 switches side-by-side.

Figure 1:
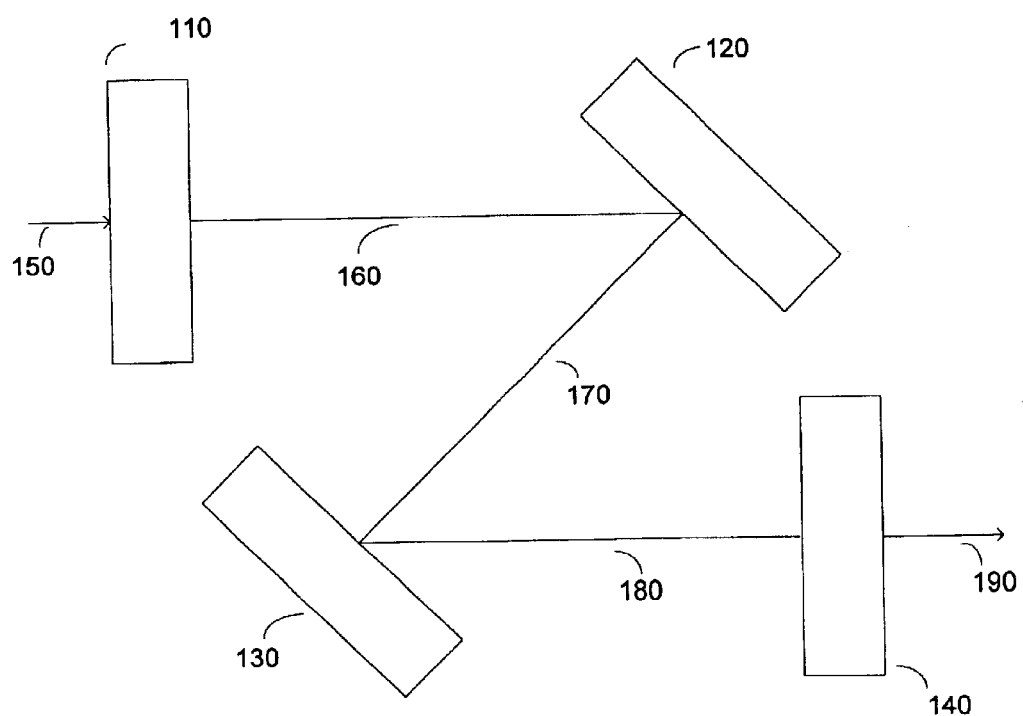
FIG. 1 is a block diagram showing an exemplary optical switch as known in the art.

FIG. 1 is a block diagram showing an exemplary optical switch 100 as known in the art. Among other things, the optical switch 100 includes input fiber collimators 110, a first MEMS array 120, a second MEMS array 130, and output fiber collimators 140. Within the optical switch 100, the first MEMS array 120 and the second MEMS array 130 are typically aligned such that each mirror of the first MEMS array 120 is directly across from a corresponding mirror of the second MEMS array 130. The input fiber collimators 110 are typically positioned so as to direct input signals from each of N input fibers to a corresponding mirror of the first MEMS array 120. The output fiber collimators 140 are typically positioned so as to direct output signals from each mirror of the second MEMS array 130 to a corresponding output fiber.

An input optical signal 150 from an input fiber is directed by an input fiber collimators 160 toward a corresponding mirror of the first MEMS array 120, as shown by the line 160. The mirror of the first MEMS array 120 reflects the signal 160 toward a selected mirror of the second MEMS array 130 corresponding to a selected output fiber, as shown by the line 170. The selected mirror of the second MEMS array 130 reflects the signal 170 to an output fiber collimator 140, as shown by the line 180. The output fiber collimator 140 directs the signal 180 toward the corresponding output fiber, as shown by the line 190. It should be noted that the input fiber collimators 110, first MEMS array 120, second MEMS array 130, and output fiber collimators 140 are typically separated in space and are typically not coupled through a tangible optical medium (such as an optical fiber), and therefore such an optical switch is sometimes referred to as a "free space" optical switch.

Figure 2:
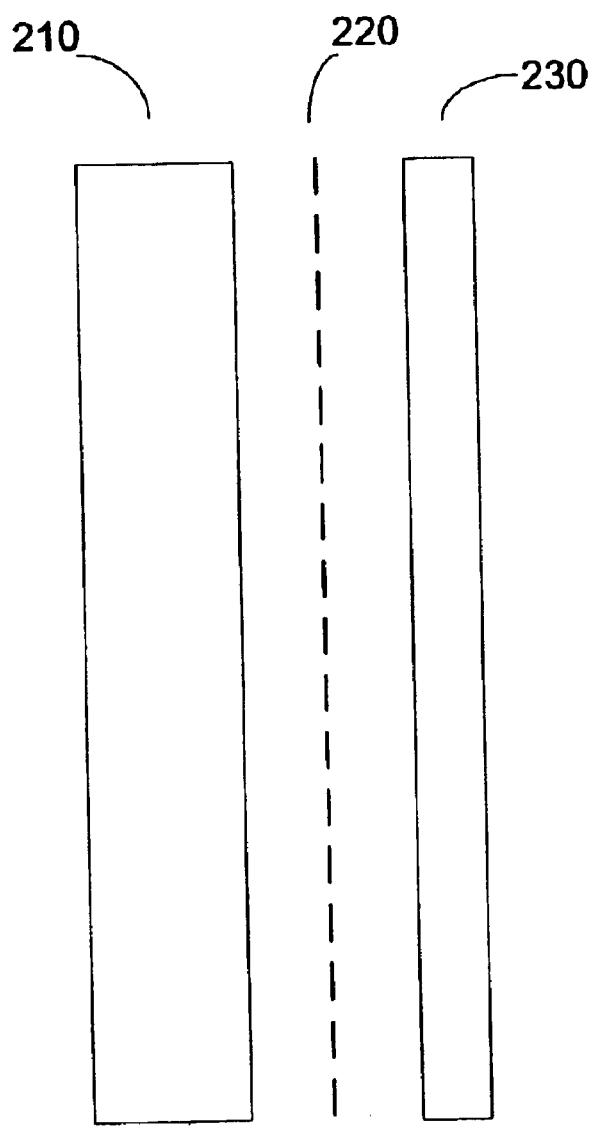
FIG. 2 is a block diagram showing a cross-sectional view of an exemplary MEMS array as known in the art.

FIG. 2 is a block diagram showing a cross-sectional view of an exemplary MEMS array 200 as known in the art. Among other things, the MEMS array 200 includes a substrate 210, a number of mirrors 220 formed on or from the substrate 210, and a cover 230. The mirrors 220 are typically suspended from the substrate 210 on minute tethers (not shown for convenience) that allow the mirrors to move through some range of motion. The position of each mirror 220 is typically controlled electronically, for example, using electrostatic forces. The cover 230 protects the extremely fragile mirrors 220 and also enables optical signals to pass to and from the mirrors 220.

In an embodiment of the present invention, a single MEMS device includes all components necessary to switch optical signals between N inputs and N outputs.

In certain embodiments of the present invention, the collimating optics are formed integral to the substrate along with the in-plane micromachined mirrors. Specifically, N input fiber collimators, two sets of N movable mirrors, and N output fiber collimators are formed on a single MEMS substrate. The MEMS cover is typically mirrored on the side facing toward the lenses and mirrors. Each of the first set of mirrors receives an optical signal from a predetermined one of the input fibers. Each of the second set of mirrors directs an optical signal to a predetermined one of the output fibers. The N input fiber collimators and the mirrored cover combine to direct optical signals from the N input fibers respectively to the first set of N movable mirrors. Each of the first set of N movable mirrors can be positioned so as to direct the optical signal to a mirror of the second set of N movable mirrors corresponding to a predetermined output fiber. Each of the second set of N movable mirrors can be positioned so as to direct the optical signal through an output fiber collimator to the corresponding output fiber. In this way, the N optical signals are switched from the N input fibers to the N output fibers.

Optical fibers may be physically attached to the substrate in such a way that each optical fiber is optically coupled to an optical fiber collimator. The optical fibers may be physically attached by any means, including, but in no way limited to, fiber fusion, epoxy, and drilling holes into the substrate for attaching the optical fibers, to name but a few.

For convenience, various aspects of the present invention are demonstrated by example with reference to an exemplary 2×2 switch having two inputs couplable to two input fibers and two outputs couplable to two output fibers. The optical switch includes two input fiber collimators, two sets of mirrors with two mirrors in each set, and two output fiber collimators. The optical switch is capable of switching input signals from any input fiber to any output fiber.

Figure 3A:
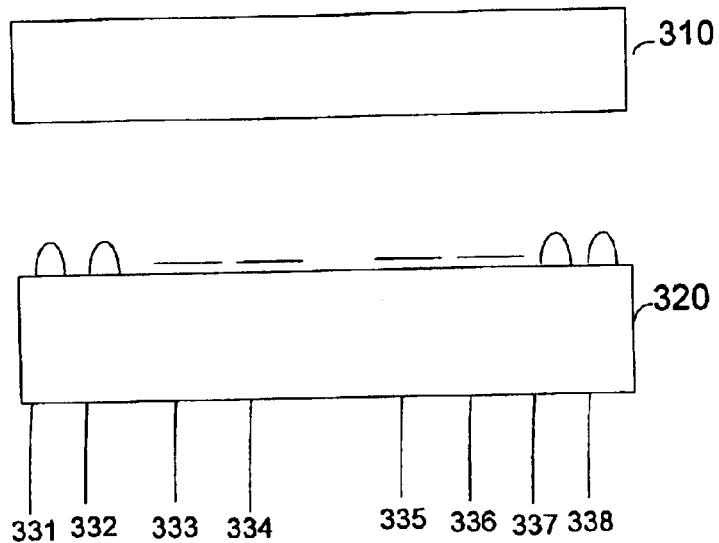
FIG. 3A is a block diagram showing an exemplary 2×2 optical switch in accordance with an embodiment of the present invention.

FIG. 3A is a block diagram showing an exemplary 2×2 optical switch 300 in accordance with an embodiment of the present invention. Among other things, the optical switch 300 includes a mirrored cover 310 and a substrate 320. On the substrate 320 are formed input fiber collimators 331 and 332, a first set of movable mirrors 333 and 334, a second set of movable mirrors 335 and 336, and output fiber collimators 337 and 338. The input fiber collimators 331 and 332 direct optical signals from two input fibers respectively to mirrors 333 and 334. The mirrors 335 and 336 direct optical signals respectively through output lenses 337 and 338 to two output fibers. The mirror 333 can be positioned to direct its optical signal to either the mirror 335 for switching the optical signal to a first output fiber via the output fiber collimator 337 or the mirror 336 for switching the optical signal to a second output fiber via the output fiber collimator 338. Similarly, the mirror 334 can be positioned to direct its optical signal to either the mirror 335 for switching the optical signal to the first output fiber via the output fiber collimator 337 or the mirror 336 for switching the optical signal to the second output fiber via the output fiber collimator 338. The mirrors 335 and 336 are positioned as appropriate to direct the optical signals to the output fibers through the output lenses 337 and 338, respectively.

Figure 3B:
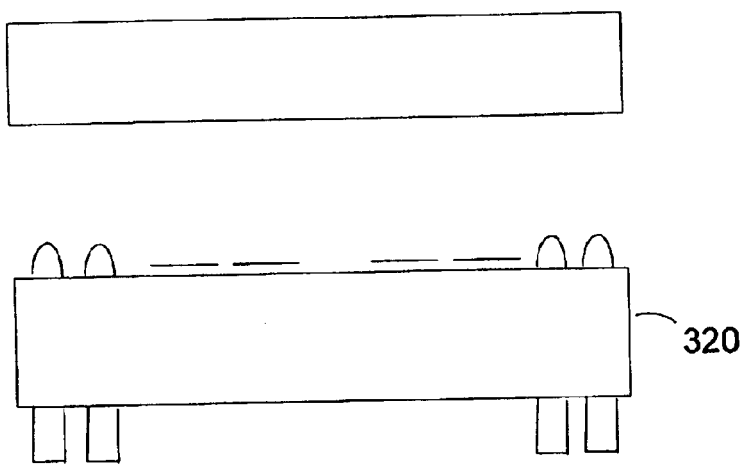
FIG. 3B is a block diagram showing an exemplary 2×2 optical switch with optical fibers attached to the substrate in accordance with an embodiment of the present invention.

FIG. 3B is a block diagram showing the exemplary 2×2 optical switch 300 with optical fibers 340 attached to the substrate 320 in accordance with an embodiment of the present invention.

Figure 4:
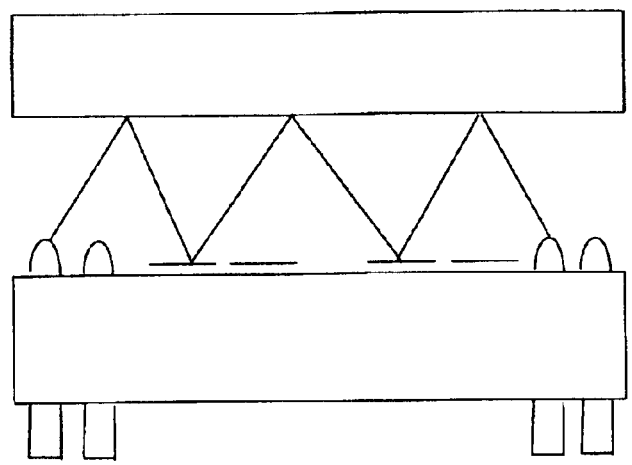
FIG. 4 is a block diagram showing an optical signal switched from a first input fiber to a first output fiber in accordance with an embodiment of the present invention.

FIG. 4 is a block diagram showing an optical signal switched from a first input fiber to a first output fiber. Specifically, the optical signal is directed from the input fiber collimator 331 to the mirror 333 via the mirrored cover. The mirror 333 is positioned so as to direct the optical signal to the mirror 335 via the mirrored cover. The mirror 335 is positioned so as to direct the optical signal to the output fiber collimator 337 via the mirrored cover. Optical fibers may be attached to the substrate, as shown.

Figure 5:
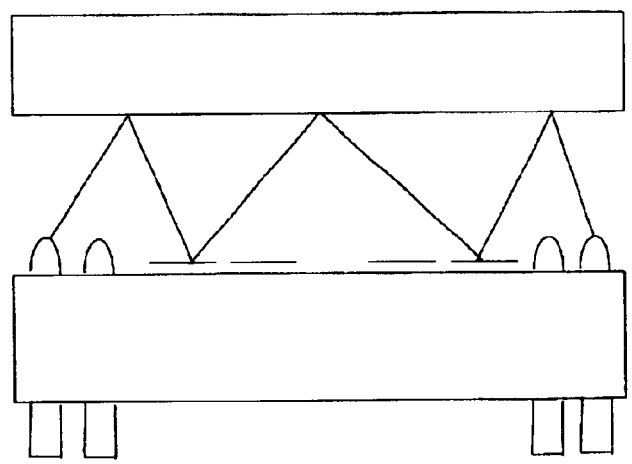
FIG. 5 is a block diagram showing an optical signal switched from a first input fiber to a second output fiber in accordance with an embodiment of the present invention.

FIG. 5 is a block diagram showing an optical signal switched from a first input fiber to a second output fiber. Specifically, the optical signal is directed from the input fiber collimator 331 to the mirror 333 via the mirrored cover. The mirror 333 is positioned so as to direct the optical signal to the mirror 336 via the mirrored cover. The mirror 336 is positioned so as to direct the optical signal to the output fiber collimator 338 via the mirrored cover. Optical fibers may be attached to the substrate, as shown.

Figure 6:
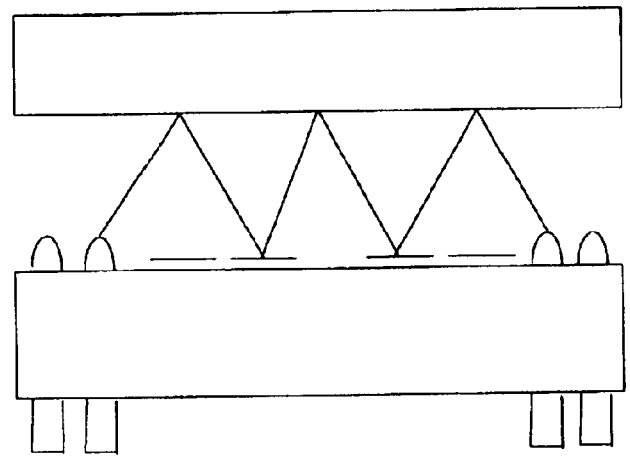
FIG. 6 is a block diagram showing an optical signal switched from a second input fiber to a first output fiber in accordance with an embodiment of the present invention.

FIG. 6 is a block diagram showing an optical signal switched from a second input fiber to a first output fiber. Specifically, the optical signal is directed from the input fiber collimator 332 to the mirror 334 via the mirrored cover. The mirror 334 is positioned so as to direct the optical signal to the mirror 335 via the mirrored cover. The mirror 335 is positioned so as to direct the optical signal to the output fiber collimator 337 via the mirrored cover. Optical fibers may be attached to the substrate, as shown.

Figure 7:
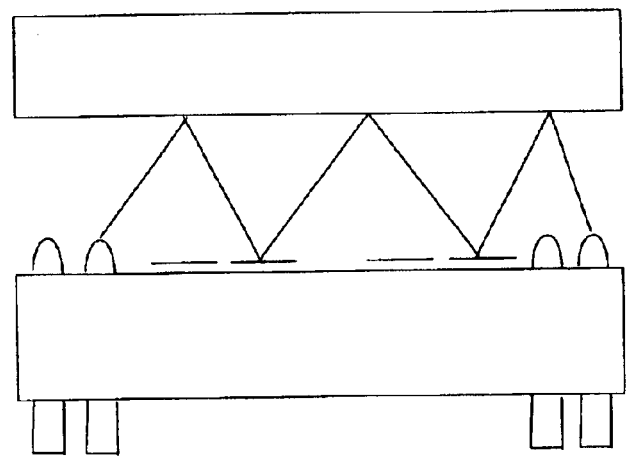
FIG. 7 is a block diagram showing an optical signal switched from a second input fiber to a second output fiber in accordance with an embodiment of the present invention.

FIG. 7 is a block diagram showing an optical signal switched from a second input fiber to a second output fiber. Specifically, the optical signal is directed from the input fiber collimator 332 to the mirror 334 via the mirrored cover. The mirror 334 is positioned so as to direct the optical signal to the mirror 336 via the mirrored cover. The mirror 336 is positioned so as to direct the optical signal to the output fiber collimator 338 via the mirrored cover. Optical fibers may be attached to the substrate, as shown.

Because the input fiber collimators and mirrored cover are not movable, they must be designed so as to direct the incoming optical signals from the input fibers to the first set of mirrors. Similarly, because the mirrored cover and output fiber collimators are not movable, they must be designed so as to direct the outgoing optical signals from the second set of mirrors to the output fibers. Moreover, the mirrored cover and output fiber collimators are preferably designed so that the outgoing optical signals enter the output fibers axially in order to reduce signal loss.

FIG. 8 shows an exemplary optical switch 800 in which the incoming and outgoing optical signals are directed in part by setting the input and output fiber collimators at an appropriate angle relative to a flat mirrored cover. Specifically, the input fiber collimators 820 and output fiber collimators 830 are positioned on the substrate 840 at an angle relative to the flat mirrored cover 810. The incoming optical signals are directed from the input fiber collimators 820 to the first set of mirrors via the flat mirrored cover 810. Similarly, the outgoing optical signals are directed from the second set of mirrors to the output fiber collimators 830 via the flat mirrored cover 810. Optical fibers may be attached to the substrate, as shown.

FIG. 9 shows an exemplary optical switch 900 in which the incoming and outgoing optical signals are directed in part by setting the ends of the mirrored cover at an appropriate angle. Specifically, the mirrored cover 910 is angled at both ends. The incoming optical signals are directed from the input fiber collimators 920 to the first set of mirrors via an angled portion of the mirrored cover 910. Similarly, the outgoing optical signals are directed from the second set of mirrors to the output fiber collimators 930 via an angled portion of the mirrored cover 910. The input fiber collimators 920 and output fiber collimators 930 are positioned on the substrate 940 as appropriate. Optical fibers may be attached to the substrate, as shown.

FIG. 10 shows an exemplary optical switch 1000 in which the incoming and outgoing optical signals are directed in part using a curved mirrored cover. Specifically, the mirrored cover 1010 is curved in such a way that the incoming optical signals are directed from the input fiber collimators 1020 to the first set of mirrors and the outgoing optical signals are directed from the second set of mirrors to the output fiber collimators 1030. The input fiber collimators 1020 and output fiber collimators 1030 are positioned on the substrate 1040 as appropriate. Optical fibers may be attached to the substrate, as shown.

Figure 12:
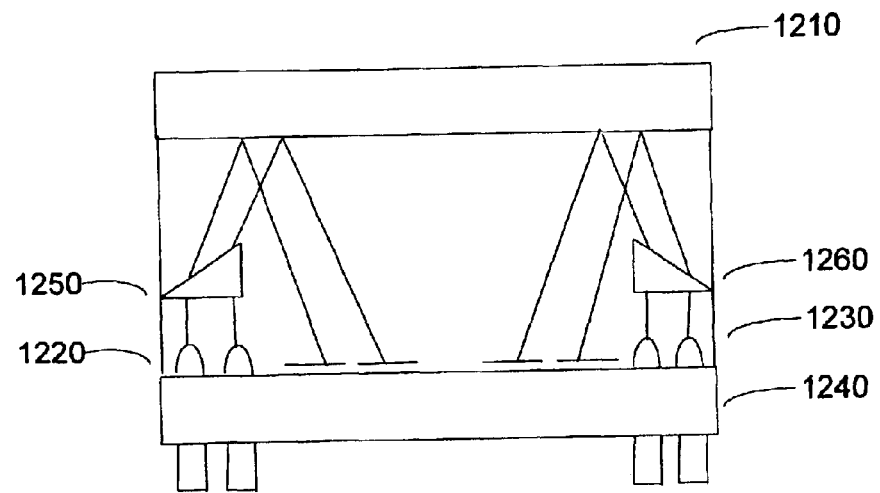
FIG. 12 shows an exemplary optical switch 1200 in which the incoming and outgoing optical signals are directed in part using optical wedges in accordance with an embodiment of the present invention.

FIG. 12 shows an exemplary optical switch 1200 in which the incoming and outgoing optical signals are directed in part using optical wedges in accordance with an embodiment of the present invention. Specifically, the input collimators 1220 and output collimators 1230 are positioned in the substrate 1240 facing substantially toward the mirrored cover 1210. An input optical wedge 1250 is positioned between the input collimators 1250 and the mirrored cover 1210 in order to direct the incoming signals to the first set of mirrors. An output optical wedge 1260 is positioned between the output collimators 1230 and the mirrored cover 1210 in order to direct the outgoing signals from the second set of mirrors. Optical fibers may be attached to the substrate, as shown.

It should be noted that the fiber collimators and movable mirrors need not be positioned linearly on the substrate.

Figure 13:
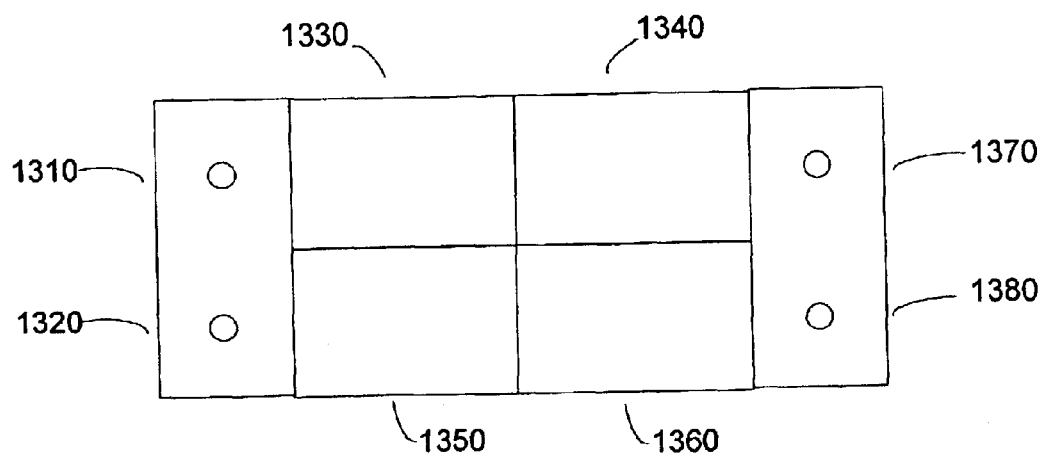
FIG. 13 shows an exemplary optical switch 1300 in which two adjacent collimator/mirror configurations are used to switch optical signals from two input fibers to two output fibers in accordance with an embodiment of the present invention.

FIG. 13 shows an exemplary optical switch 1300 in which two adjacent collimator/mirror configurations are used to switch optical signals from two input fibers to two output fibers in accordance with an embodiment of the present invention. Specifically, the optical switch 1300 includes two input fiber collimators 1310 and 1320, a first set of movable mirrors 1330 and 1350, a second set of movable mirrors 1340 and 1360, and two output fiber collimators 1370 and 1380. The input fiber collimator 1310 directs a corresponding input signal to the movable mirror 1330. The input fiber collimator 1320 directs a corresponding input signal to the movable mirror 1350. The output fiber collimator 1370 receives a corresponding output signal from the movable mirror 1340. The output fiber collimator 1380 receives a corresponding output signal from the movable mirror 1360. The movable mirror 1330 can be controlled to direct the input signal from the input fiber collimator 1310 to either the movable mirror 1340 for switching the signal to the output fiber collimator 1370 or the movable mirror 1360 for switching the signal to the output fiber collimator 1380. The movable mirror 1350 can be controlled to direct the input signal from the input fiber collimator 1320 to either the movable mirror 1340 for switching the signal to the output fiber collimator 1370 or the movable mirror 1360 for switching the signal to the output fiber collimator 1380. Optical fibers may be attached to the substrate, as shown.

It should be noted that a configuration of fiber collimators and mirrors, such as the configuration shown in FIG. 3 or FIG. 13, can be replicated multiple times on the substrate and covered by a single fixed mirrored cover to form a 2×2×N optical switch.

Figure 14:
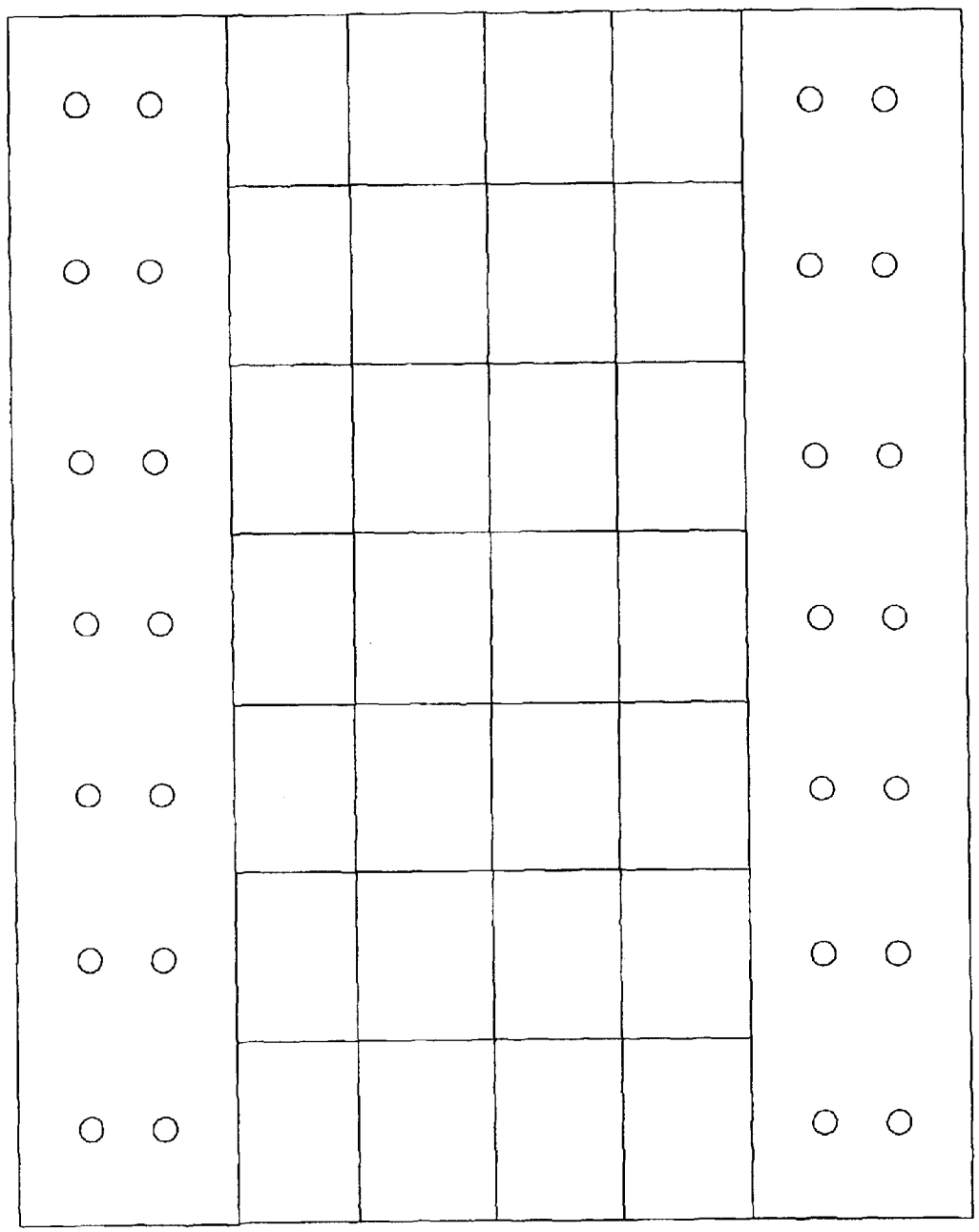
FIG. 14 shows an exemplary 2×2×N optical switch 1400 based upon a linear configuration of fiber collimators and movable mirrors in accordance with an embodiment of the present invention.

FIG. 14 shows an exemplary 2×2×N optical switch 1400 based upon a linear configuration of fiber collimators and movable mirrors in accordance with an embodiment of the present invention. Each 2×2 switch includes two input fiber collimators, four movable mirrors, and two output fiber collimators. In this example, the fiber collimators and movable mirrors associated with each 2×2 switch are linearly aligned on the substrate. Optical fibers may be attached to the substrate, as shown.

In certain embodiments of the present invention, the collimating optics are formed integral to the MEMS cover along with the one or more fixed reflectors (mirrors). Specifically, two sets of N movable mirrors are formed on a single MEMS substrate, while N input fiber collimators and N output fiber collimators are formed on the MEMS cover along with the at least one fixed reflector (mirror). Each of the first set of mirrors receives an optical signal from a predetermined one of the input fibers. Each of the second set of mirrors directs an optical signal to a predetermined one of the output fibers. The N input fiber collimators direct optical signals from the N input fibers respectively to the first set of N movable mirrors. Each of the first set of N movable mirrors can be positioned so as to direct the optical signal to a mirror of the second set of N movable mirrors corresponding to a predetermined output fiber via a fixed reflector (mirror) on the MEMS cover. Each of the second set of N movable mirrors can be positioned so as to direct the optical signal through an output fiber collimator to the corresponding output fiber. In this way, the N optical signals are switched from the N input fibers to the N output fibers.

Optical fibers may be physically attached to the cover in such a way that each optical fiber is optically coupled to an optical fiber collimator. The optical fibers may be physically attached by any means, including, but in no way limited to, fiber fusion, epoxy, and drilling holes into the substrate for attaching the optical fibers, to name but a few.

For convenience, various aspects of the present invention are demonstrated by example with reference to an exemplary 2×2 switch having two inputs couplable to two input fibers and two outputs couplable to two output fibers. The optical switch includes two input fiber collimators, two sets of mirrors with two mirrors in each set, and two output fiber collimators. The optical switch is capable of switching input signals from any input fiber to any output fiber.

Figure 15:
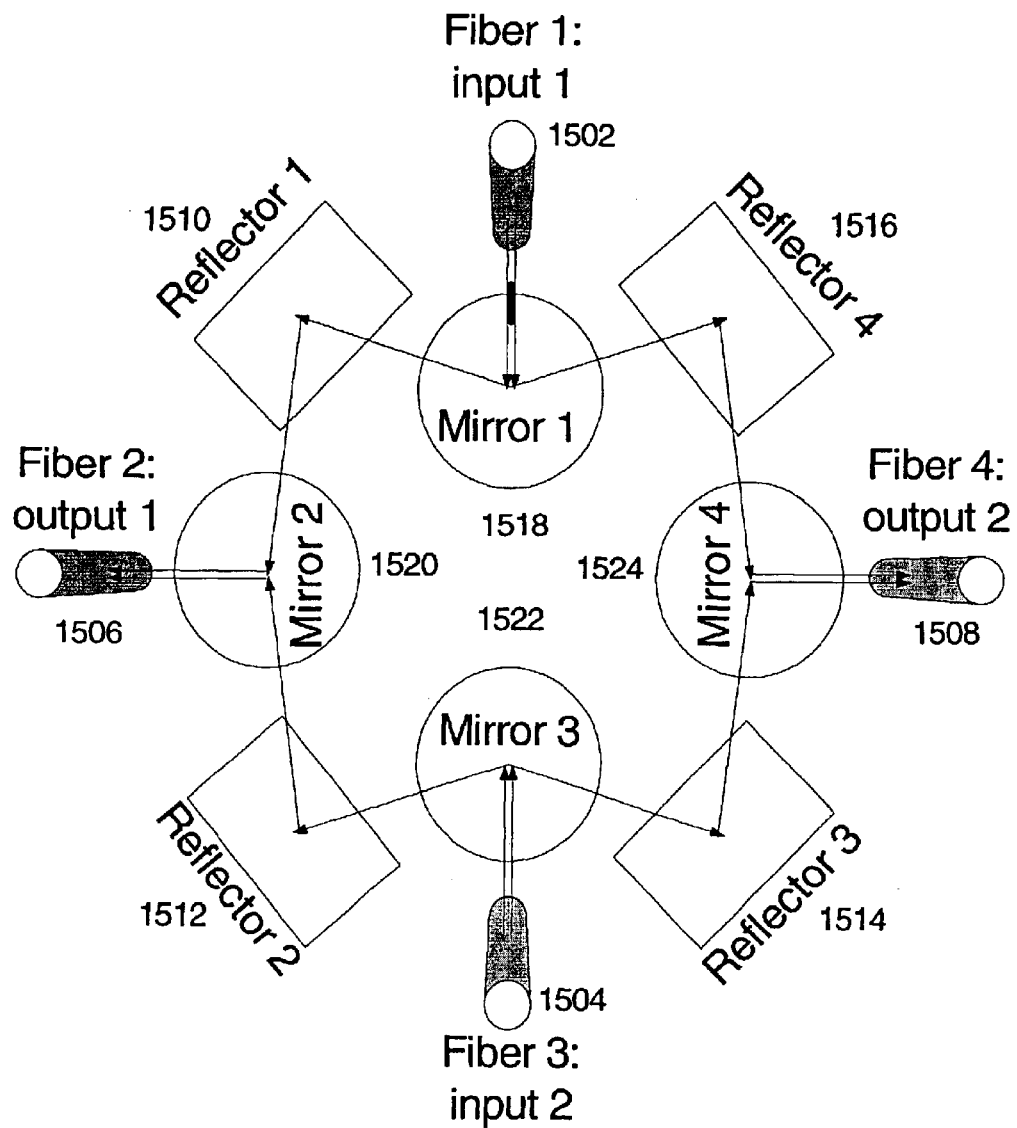
FIG. 15 shows a top view of a conceptual 2×2 optical switch in which the optical fiber collimators are formed in the MEMS cover in accordance with an embodiment of the present invention.

FIG. 15 shows a top view of a conceptual 2×2 optical switch in which the optical fiber collimators are formed in the MEMS cover. Shown are two input fibers 1502 and 1504, two output fibers 1506 and 1508, four reflectors 1510, 1512, 1514, and 1516, and four movable mirrors 1518, 1520, 1522, and 1524. Optical signals from input fiber 1502 are directed to movable mirror 1518 via an optical fiber collimator (not shown). Optical signals from input fiber 1504 are directed to movable mirror 1522 via an optical fiber collimator (not shown). Optical signals from movable mirror 1520 are directed to output fiber 1506 via an optical fiber collimator (not shown). Optical signals from movable mirror 1524 are directed to output fiber 1508 via an optical collimator (not shown). The movable mirrors are positioned to switch optical signals from either input fiber to either output fiber.

In order to switch input fiber 1502 to output fiber 1506, the optical signal from input fiber 1502 is directed to movable mirror 1518. Movable mirror 1518 is positioned so as to direct the optical signal off of reflector 1510 to movable mirror 1520. Movable mirror 1520 is positioned to direct the optical signal to output fiber 1506.

In order to switch input fiber 1502 to output fiber 1508, the optical signal from input fiber 1502 is directed to movable mirror 1518. Movable mirror 1518 is positioned so as to direct the optical signal off of reflector 1516 to movable mirror 1524. Movable mirror 1524 is positioned to direct the optical signal to output fiber 1508.

In order to switch input fiber 1504 to output fiber 1506, the optical signal from input fiber 1504 is directed to movable mirror 1522. Movable mirror 1522 is positioned so as to direct the optical signal off of reflector 1512 to movable mirror 1520. Movable mirror 1520 is positioned to direct the optical signal to output fiber 1508.

In order to switch input fiber 1504 to output fiber 1508, the optical signal from input fiber 1504 is directed to movable mirror 1522. Movable mirror 1522 is positioned so as to direct the optical signal off of reflector 1514 to movable mirror 1524. Movable mirror 1524 is positioned to direct the optical signal to output fiber 1508.

Some exemplary 2×2 optical switch designs are described below.

Figure 16:
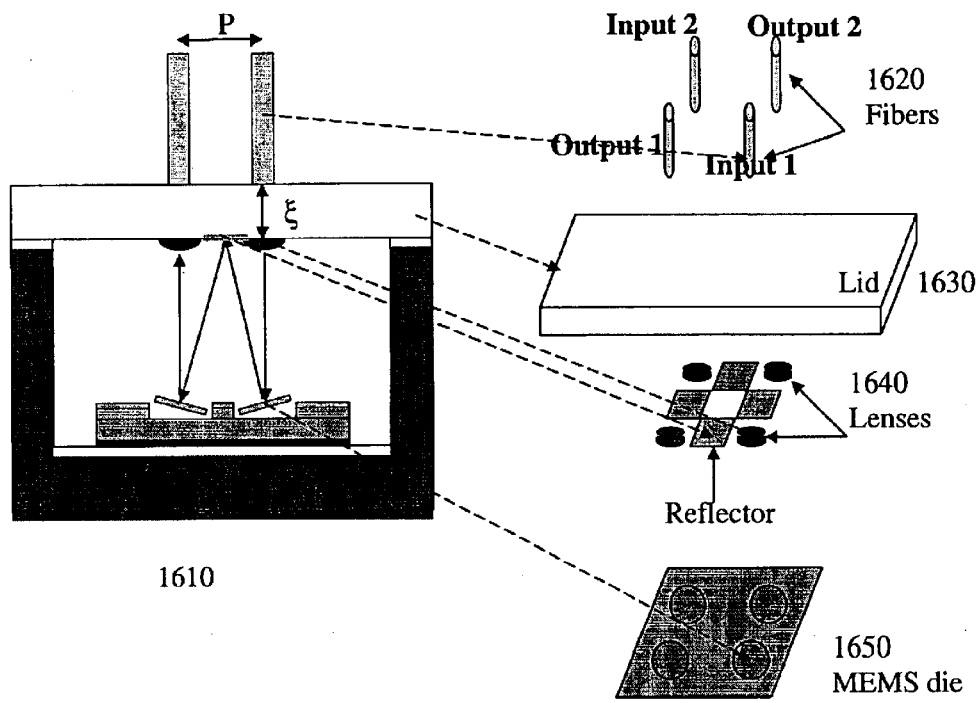
FIG. 16 shows a first exemplary design for a 2×2 optical switch having optical fiber collimators formed in the MEMS cover and optical fibers attached to the MEMS cover in accordance with an embodiment of the present invention.

FIG. 16 shows a first exemplary design 1600 for a 2×2 optical switch having optical fiber collimators formed in the MEMS cover and optical fibers attached to the MEMS cover. Shown are a side view 1610 and views of the four optical fibers 1620, the MEMS cover (lid) 1630, the configuration of the optical fiber collimators (lenses) and reflectors 1640 on the MEMS cover 1630, and the configuration of movable mirrors on the MEMS die 1650. In this design, the optical paths to and from the movable mirrors are set substantially perpendicular to the plane of the movable mirrors. Optical fibers may be attached to the cover, as shown.

FIG. 17 shows a second exemplary design 1700 for a 2×2 optical switch having optical fiber collimators formed in the MEMS cover and optical fibers attached to the MEMS cover. Shown are a side view 1720 and a top view 1710. In this design, the optical paths to and from the movable mirrors are set at an angle to the plane of the movable mirrors. The MEMS cover is shaped like an inverted "V," with the inside surfaces mirrored sufficiently to reflect optical signals between movable mirrors. Optical fibers may be attached to the cover, as shown.

Figure 18:
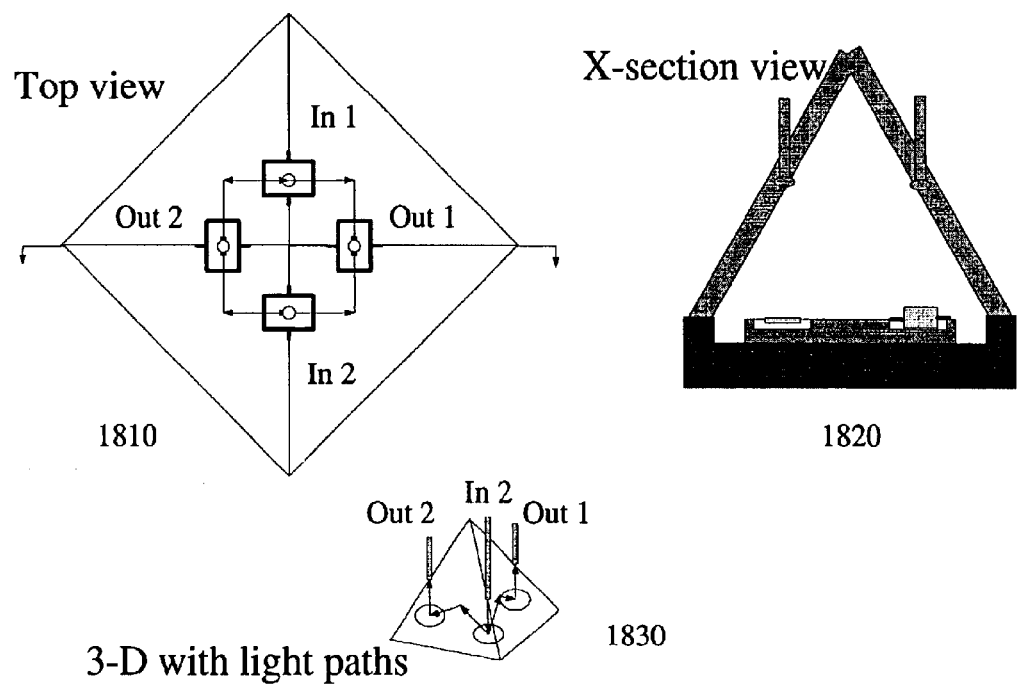
FIG. 18 shows a third exemplary design for a 2×2 optical switch having optical fiber collimators formed in the MEMS cover and optical fibers attached to the MEMS cover in accordance with an embodiment of the present invention.

FIG. 18 shows a third exemplary design 1800 for a 2×2 optical switch having optical fiber collimators formed in the MEMS cover and optical fibers attached to the MEMS cover. Shown are a top view 1810, a cross-sectional view 1820, and a three-dimensional view 1830 with representations of two possible light paths from an input fiber to one of two output fibers. In this design, the optical paths to and from the movable mirrors are set substantially perpendicular to the plane of the movable mirrors. The MEMS cover is shaped like a four-sided pyramid, with the inside surfaces mirrored sufficiently to reflect optical signals between movable mirrors. Optical fibers may be attached to the cover, as shown.

Figure 19:
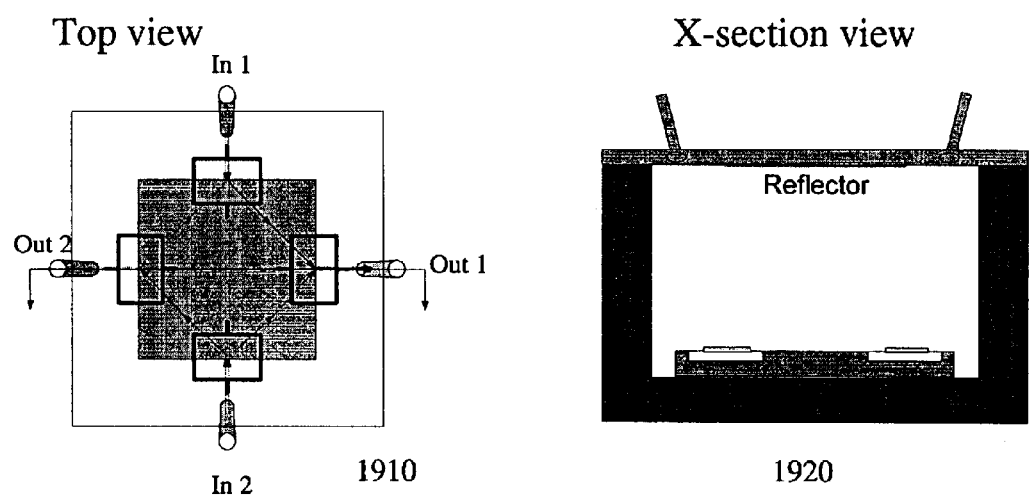
FIG. 19 shows a fourth exemplary design for a 2×2 optical switch having optical fiber collimators formed in the MEMS cover and optical fibers attached to the MEMS cover in accordance with an embodiment of the present invention.

FIG. 19 shows a fourth exemplary design 1900 for a 2×2 optical switch having optical fiber collimators formed in the MEMS cover and optical fibers attached to the MEMS cover. Shown are a top view 1910 and a cross-sectional view 1920. In this design, the optical paths to and from the movable mirrors are set at an angle to the plane of the movable mirrors. A single large reflector is formed on a substantially flat MEMS cover. Optical fibers may be attached to the cover, as shown.

Regarding the use of fiber fusion to couple the optical fibers to the package, it should be noted that fusion (splicing) has been one of ways of joining fibers. It is a type of weld. The two fiber ends are butted up to one another and fused by heat to join. This fiber fusion process can be applied to other glass-made optical components such as cover glass and collimator lenses, and indeed it has emerged as a commercially available technology.

Regarding the use of epoxy to couple the optical fibers to the package, it should be noted that fiber optic communication products can be assembled by aligning a fiber, then epoxy bonding it to the device. Thermoset organics, including optical grade epoxies, shrink slightly during cure while thermoplastic organic adhesives shrink when they cool.

These dimensional effects are particularly serious in products that mount fibers in grooves and on planar surfaces because such designs are not symmetrical around the fiber axis. As a result, cure and thermal shrinkage cause alignment shifts that lead to yield loss and performance degradation. Thus the current design practices, materials and assembly processes are not well matched. To avoid this problem, some implementations of the present invention orient the ends of fibers perpendicular to the surface of an optical window in the package. An optical grade organic adhesive, such as an epoxy, bonds the fiber to the window after it is aligned to a lens that is also part of the package. To minimize cure stress and misalignment, a minimal amount of adhesive is uniformly applied to the joint. This thin adhesive also optically couples the fiber to the optical window to minimize loss of optical power. Another implementation uses a glass, metal or viscous organic adhesive to hold fibers in circular feedthroughs while they are dynamically aligned to a suitable target. These fibers have lenses attached to their ends. In these various implementations, initial epoxy cure is normally achieved by using UV curing adhesives and a UV light source that uniformly illuminates the joint. Final cure can be thermal as is the present industry practice. However, thermal conduction transfers energy from outside surfaces to interior regions so they exacerbate the effects of any non-uniformity in adhesive application and unsymmetrical design. Variable frequency microwave curing systems, for example products supplied by Lambda Technologies (Morrisville, N.C.), avoid this limitation. Variable frequency systems avoid the standing wave patterns that result when fixed frequency microwave sources are used. Therefore, they can even be used in subassemblies that contain metal. Epoxies and other organics that absorb microwave energy are rapidly and uniformly postcured. When applied to post-cure of aligned fiber optic components, only the epoxy absorbs the microwave energy. Since the glass mating surfaces and other components remain at ambient temperature, the thermal stresses and alignment shifts caused by thermal expansion are eliminated and cure shrinkage is both uniform and symmetric.

Regarding the use of drilling and attachment to couple the optical fibers to the package, it should be noted that drilling and attachment can be done in a variety of ways.

In one exemplary embodiment, the package consists of a ceramic base and a metal lid that has drilled holes. Fibers (with attached AR coated lenses) are sealed in the holes. A feature of this approach is that direct fiber-lens contact eliminates variation in the distance between the end of the fiber and the lens (device performance is extremely sensitive to any changes in this distance). Fiber strain relief is provided by the through-hole design and focal length variations are made by adjusting fiber length during the automated alignment process before sealing the fibers into the lid.

In another exemplary embodiment, a lens array is attached to a metal lid that has drilled holes. Most of the lens array top surface is metallized so this glass part can be hermetically soldered to the metal lid. Metal lids are readily attached to ceramic bases. The fibers are inserted into the lid holes, aligned and then bonded to the lens array (the package can be hermetic even if this bond is not hermetic). Fiber attach can occur either before or after sealing the lid to the ceramic base. In addition to easing lid-to-package sealing, the grounded metal lid protects the device against exterior sources of static charges (buildup of static charge on the lens array can degrade mirror position control). Fiber strain relief is provided by the through-hole design and focal length adjustments are made by moving the fiber along its axis before joining it to the lens array.

In certain embodiments of the invention, fiber pigtails are mounted in the cap/lid in such a way that the fibers penetrate through the lid (or die cap) seals. By allowing the fiber pigtails to penetrate through the lid (or die cap) seals, anti-reflective (AR) coated glass windows can be eliminated. Instead, each fiber typically has an AR coated collimating lens attached to the fiber tip, or the tip is shaped to provide collimation. When the fibers are fused into the caps, they are aligned to an orientation and length that results in a short optimized optical path after the fiber/cap composite is assembled over the movable MEMS mirrors.

Such embodiments of the invention remove the cap (or package window) and window/cap interface reflections from the optical path. Thus, the optical path typically has three reflections, which is notable because some 2×2 optical switch designs have five reflections in, the optical path. Gold mirrors have approximately three percent loss per reflection, so reducing the number of reflections from five to three reduces optical loss. It should be noted, though, that even the approximately nine percent loss for three reflections may be too high 0.5 dB product specification, in which case dielectric mirrors may be used instead.

In various embodiments of the invention, the fiber pigtails are integrated into plastic cap wafers. For example, several thousand fibers may be placed in a jig and accurately located in a mold to produce fiber/plastic composites.

It has been shown that cap wafers can be aligned and sealed to wafers with a 10–15$\mu$ tolerance in a 450 C glass seal process. The lower temperatures required for optical products should give better alignment, but even 10–15$\mu$ is sufficient for rough alignment. Final alignment would use wafer level test equipment to measure the optimum mirror angles.

Among other things, plastic capping lowers manufacturing costs and assumes the use of wafer passivation. It has been shown that WASA coatings provide such passivation (at 150 volts, leakage currents across 2 micron gaps was reduced to the low pico-amp range, even in high humidity).

Figure 20:
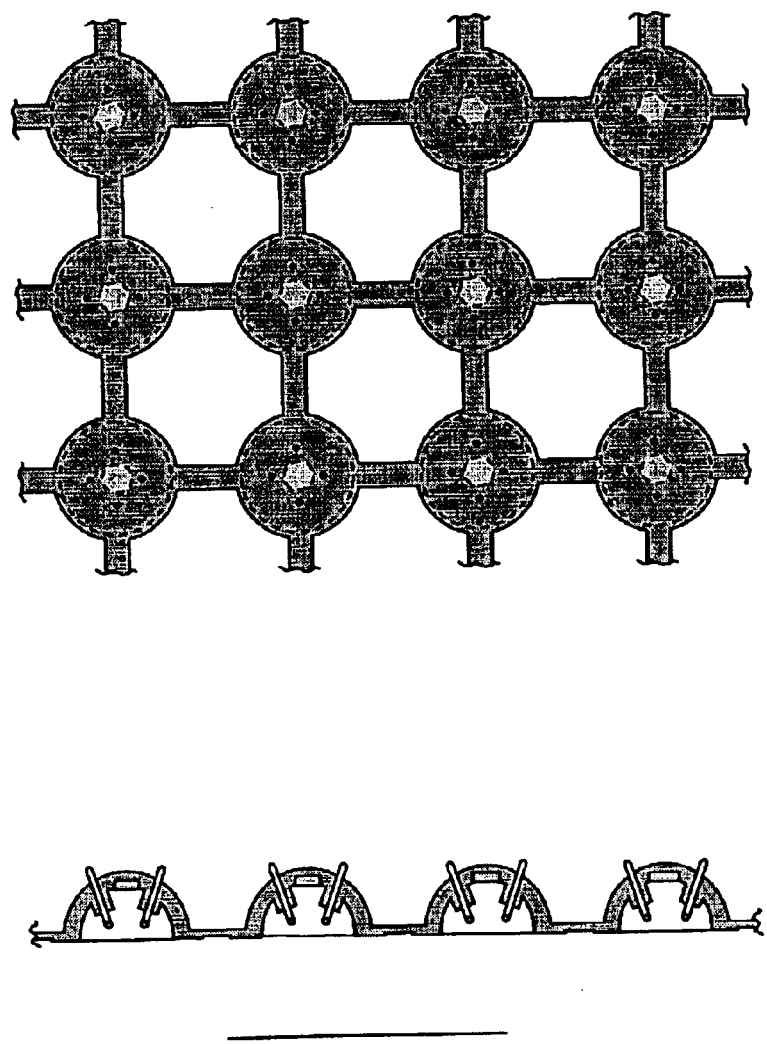
FIG. 20 shows exemplary plastic cap wafers with integrated fiber pigtails in accordance with an embodiment of the present invention.

FIG. 20 shows top and cross-sectional views of plastic cap wafers with integrated fiber pigtails in accordance with an embodiment of the present invention. Fiber pigtails are molded into cap wafers (the fibers are omitted in the top view for the sake of clarity). Anti-stat plastic formulations will eliminate static charge effects. Use of opaque plastic will reduce stray background light (although a transparent cap may be preferable for manufacturing). Rigid, low thermal expansion plastic is preferred for dimensional control. Standard mask/wafer alignment techniques are used to rough align the fiber/cap wafer to the optical wafer within 10~15 microns. Thermal, adhesive, or ultrasonic bonding seals the caps to the wafer. Cap-to-cap ligaments are cut after wafer bonding.

Figure 22A:
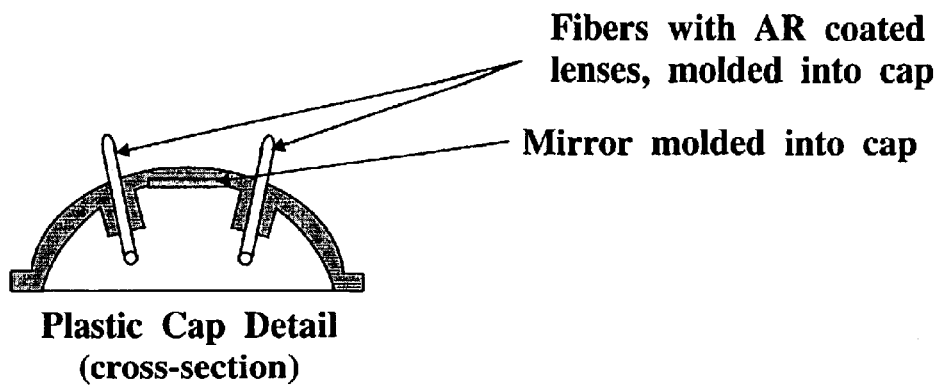
FIG. 22A shows a cross-sectional view of an exemplary plastic cap having fibers with anti-reflective coated lenses molded into the cap in accordance with an embodiment of the present invention.

FIG. 22A shows a cross-sectional view of an exemplary plastic cap having fibers with anti-reflective coated lenses molded into the cap in accordance with an embodiment of the present invention.

FIG. 23 shows top and cross-sectional views of an exemplary 2×2 optical switch having the plastic cap and integrated fiber pigtails of FIG. 22A bonded to an optical MEMS device with optional integrated electronics in accordance with an embodiment of the present invention. This figure shows the optical path from AR coated lenses to mirrors and through cavity gas—without passing through the cap itself.

Individual plastic caps can be molded with integrated fibers and assembled on die. This approach is probably less cost effective for die level caps but is appropriate for package level products.

FIG. 25 shows top and cross-sectional views of an exemplary 2×2 optical switch having an optical MEMS device in a ceramic package with the plastic cap and integrated fiber pigtails of FIG. 22A in accordance with an embodiment of the present invention.

With regard to plastic caps, one unknown is whether WASA passivation is sufficient to protect the MEMS region. The electronic portion of the die is typically protected by nitride passivation.

In various embodiments of the invention, the fiber pigtails are integrated into metal cap wafers. The fibers are typically aligned and sealed into metal cap wafers after the wafers are formed. Among other things, metal capping allows the production of die level optical products that are robust, fully hermetic, high performance, and capable of being manufactured at low cost. In hermetic designs, the fibers are typically glass sealed into the caps. Hermetic bonding of metal caps onto temperature sensitive optical wafers can be accomplished by placing a metal seal ring on the die surface to allow use of a low temp solder seal alloy.

The metal lids can be etched with processes that are currently used to etch IC leadframes. Glass seal vendors are also available. Standard lid seal techniques can be used to attach these metal lids (with integrated fiber pigtails) to ceramic packages. Handling fixtures will generally be required during assembly in order to avoid damaging lids that have fiber pigtail ends protruding from both surfaces.

Figure 21:
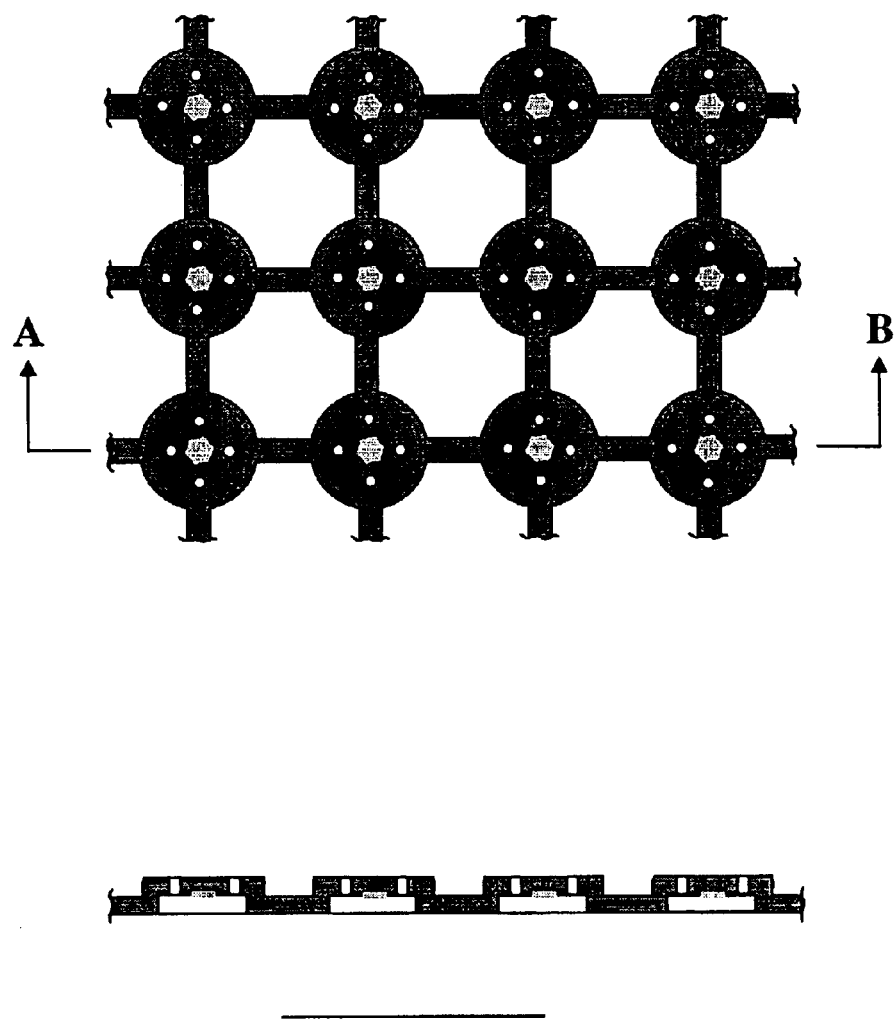
FIG. 21 shows exemplary metal cap wafers with integrated fiber pigtails in accordance with an embodiment of the present invention.

FIG. 21 shows exemplary metal cap wafers with integrated fiber pigtails in accordance with an embodiment of the present invention. Part of an etched metal cap wafer is shown before fiber assembly and after mirror insertion. Fibers are typically aligned in fixtures and glass frit (or epoxy) bonded in the cap wafer prior to wafer bonding. Low thermal expansion metals that can be etched and bonded to wafers (such alloys are used in IC package leadframes) are typically used. Invention Disclosure APD-1031 demonstrated the metal cap wafer concept on inertial wafers. The metal cap wafers can be epoxy, glass or metal soldered to the optical wafers.

Figure 22B:
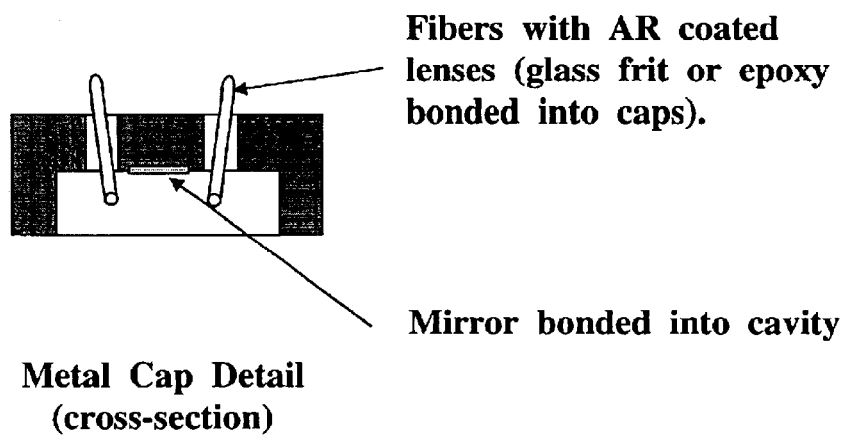
FIG. 22B shows a cross-sectional view of an exemplary metal cap having fibers with anti-reflective coated lenses bonded into the cap in accordance with an embodiment of the present invention.

FIG. 22B shows a cross-sectional view of an exemplary metal cap having fibers with anti-reflective coated lenses bonded into the cap in accordance with an embodiment of the present invention.

Figure 24:
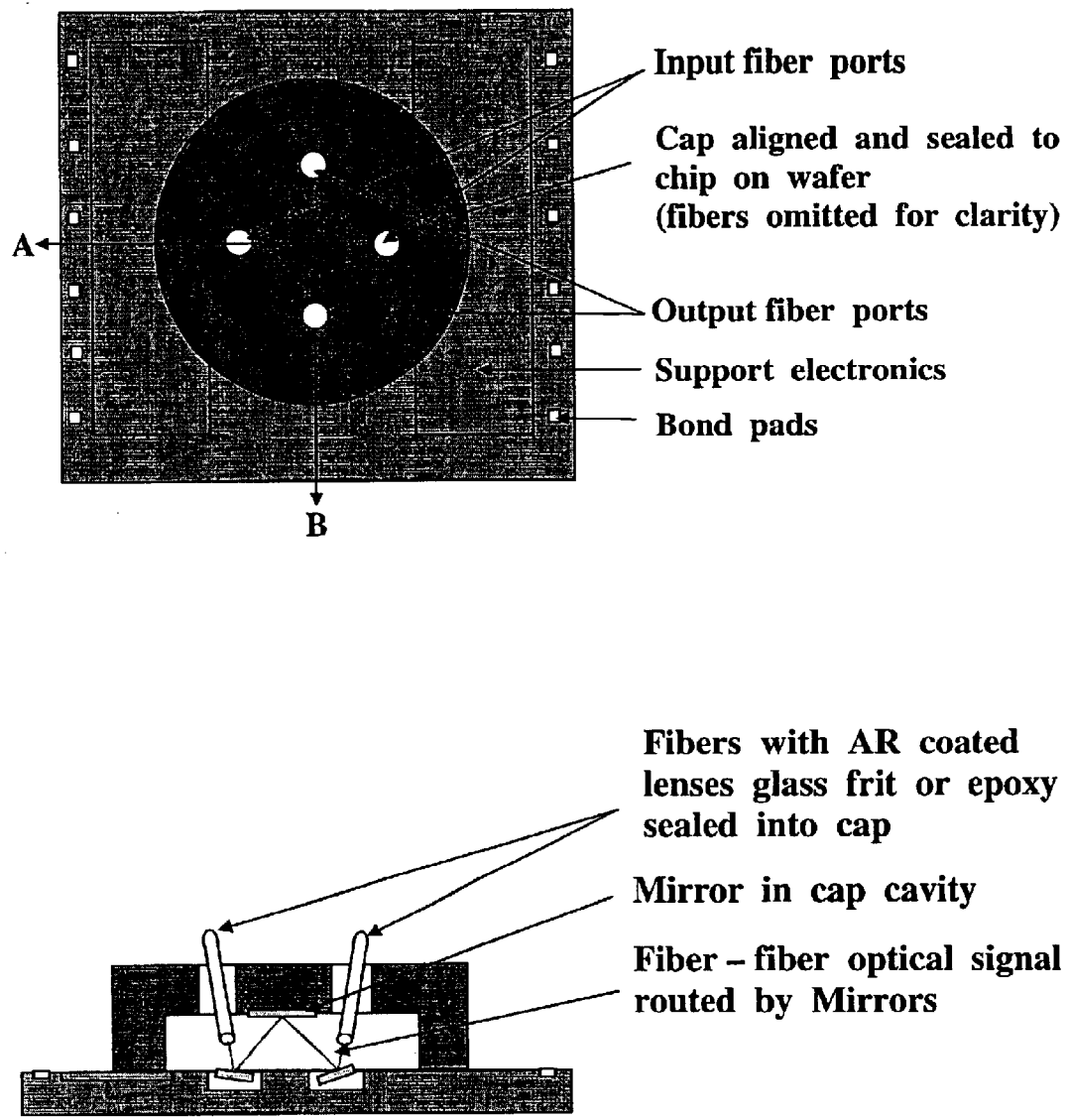
FIG. 24 shows top and cross-sectional views of an exemplary 2×2 optical switch having the metal cap and integrated fiber pigtails of FIG. 22B bonded to an optical MEMS device in accordance with an embodiment of the present invention.

FIG. 24 shows top and cross-sectional views of an exemplary 2×2 optical switch having the metal cap and integrated fiber pigtails of FIG. 22B bonded to an optical MEMS device with optional integrated electronics in accordance with an embodiment of the present invention. This figure shows the optical path from AR coated lenses to mirrors and through cavity gas—without passing through the cap itself.

Figure 26:
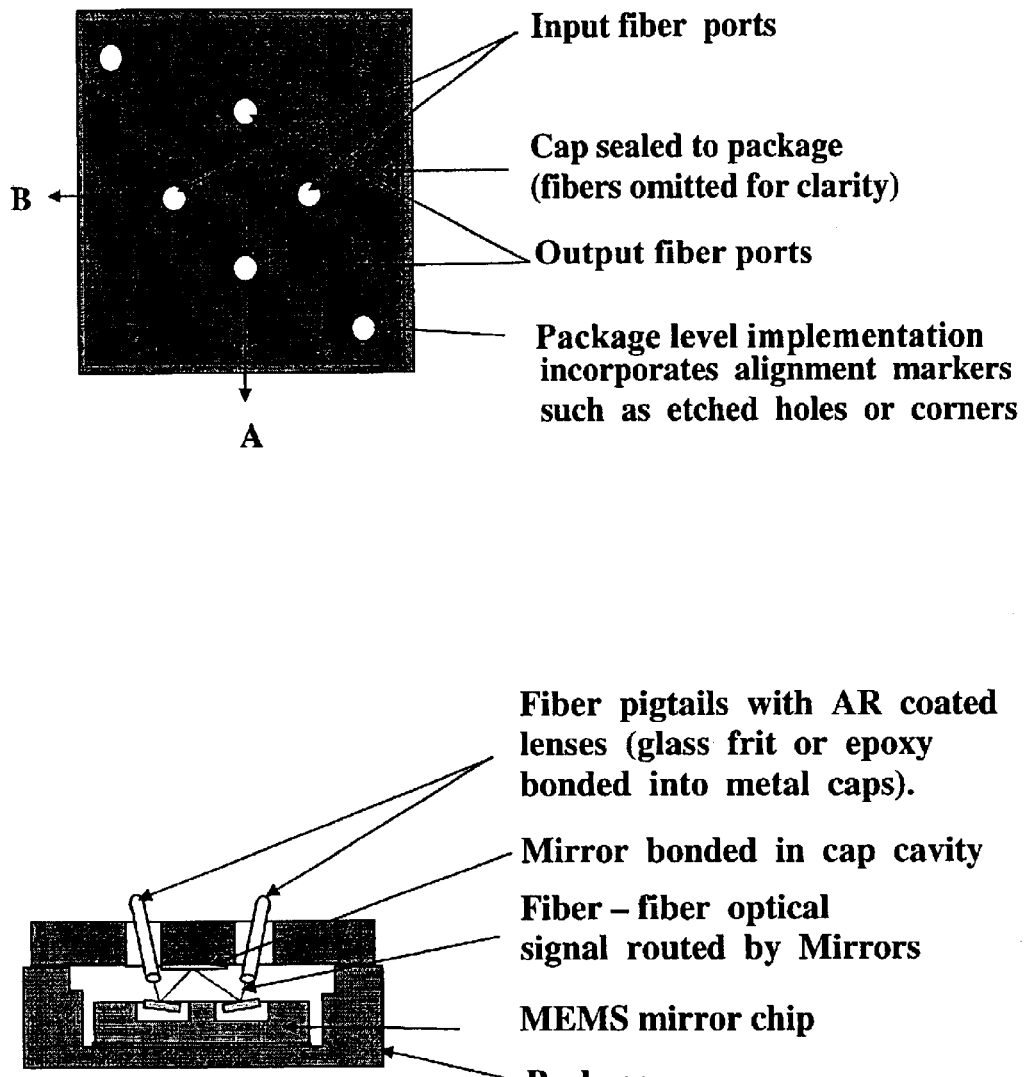
FIG. 26 shows top and cross-sectional views of an exemplary 2×2 optical switch having an optical MEMS device in a ceramic package with the metal cap and integrated fiber pigtails of FIG. 22B in accordance with an embodiment of the present invention.

FIG. 26 shows top and cross-sectional views of an exemplary 2×2 optical switch having an optical MEMS device in a ceramic package with the metal cap and integrated fiber pigtails of FIG. 22B in accordance with an embodiment of the present invention; and With regard to metal caps, one unknown is whether a low temperature seal glass will degrade optical signals (example: interdiffusion of glass constituents that change the fiber's refractive index profile). If further evaluation shows this to be a problem there are at least two alternatives:

1. Low temp solder—The solder must wet and bond to the metal cap/lid. Thermal expansion mismatch will create a compression seal at the solder-fiber interface so chemical bonding to the fiber is not essential.

2. Organic adhesive—The seal area around the fibers is small so fibers sealed with selected cross-linked epoxies would readily pass the industry standard fine and gross leak hermeticity tests.

Rather than attaching a focus lens directly to the fiber ends, certain embodiments of the present invention employ a microlens array. This construction is actually an alternative approach and may be attractive for production because package assembly can be completed through hermetic seal before the fibers are added. It can be built as follows:

1. Drill or etch holes in metal caps (or an array of caps which are later singulated).
2. Metallize back of microlens array to produce a solderable surface.
3. Metallize front of microlens array to make the mirror (alternate: deposit or bond dielectric mirror).
4. Solder microlens array(s) to cap(s) with lenses aligned to the cap holes (solder creates a hermetic seal).
5. Seal these lid/microlens composites to populated packages.
6. The package is now assembled and ready for fiber mount. Insert fibers and index-matching optical coupling media into the cap holes. Epoxy-mount the fibers.
7. Attach strain relief (can strain relieve individual fibers but a urethane or silicone casting might be better).

Mirror tilt angle alignment is typically performed after the hermetic product, with attached fibers, is assembled.

Figure 27:
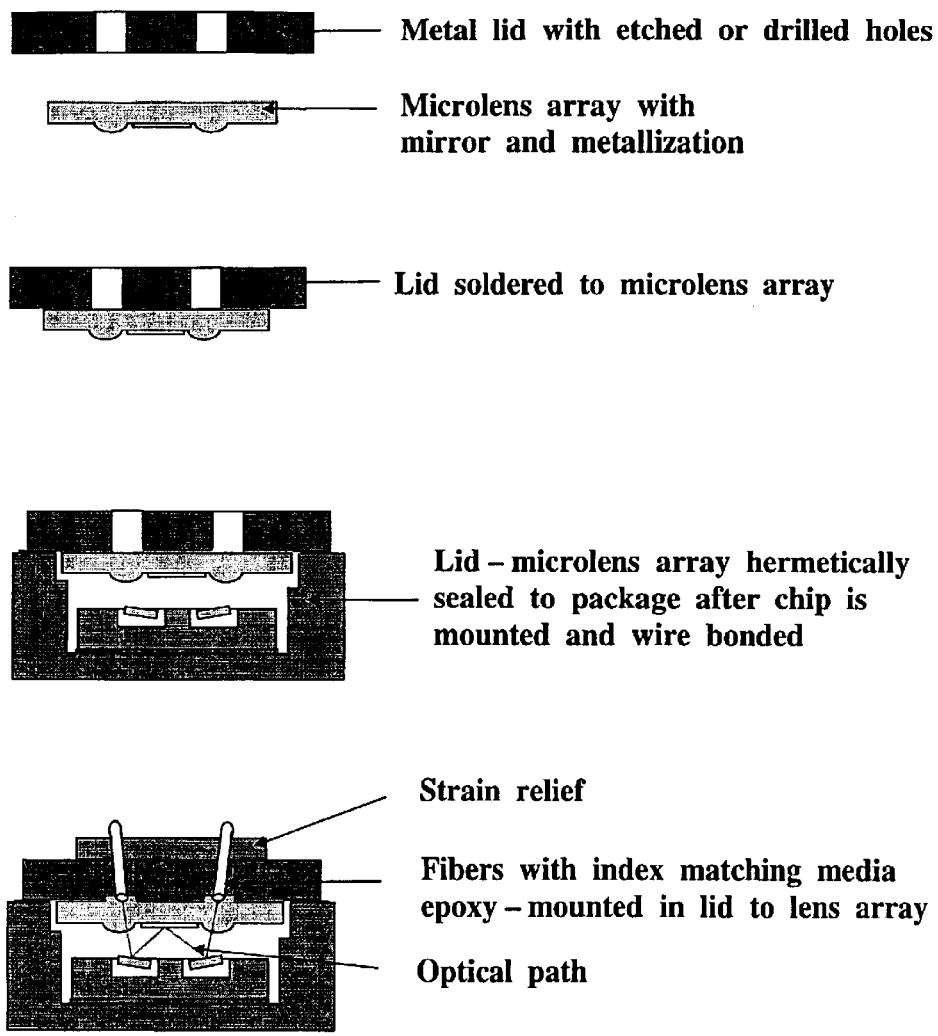
FIG. 27 demonstrates the assembly of a metal lid with microlens array in accordance with an embodiment of the present invention.

FIG. 27 demonstrates the assembly of a metal lid with microlens array in accordance with an embodiment of the present invention.

It should be noted that certain embodiments of the present invention will accommodate movable mirrors with one axis of rotation for switching optical signals, while other embodiments may require or benefit from movable mirrors with two axes of rotation for switching optical signals. Even in embodiments of the present invention that can accommodate movable mirrors with one axis of rotation for switching optical signals, it may be beneficial to use movable mirrors with two axes of rotation, with the second axis of rotation being used for non-switching purposes such as beam alignment.

Although various aspects of the present invention are described above with reference to 2×2 switches, it will be apparent to a skilled artisan how various embodiments of the present invention can be expanded to support higher level switching (e.g., 3×3, 4×4, etc.). For example, a 3×3 switch might be built by positioning three input fiber collimators, six movable mirrors, and three output fiber collimators linearly on the substrate or by placing three adjacent collimator/mirror configurations on the substrate, with each collimator/mirror configuration having an input fiber collimator, two movable mirrors, and an output fiber collimator.

As described above, in certain embodiments of the invention, there are two MEMS mirrors in each optical path. Among other things, the two MEMS mirrors can be controlled so as to compensate for misalignment errors. When fibers are attached to the cover or to the collimating optics of the system, various types of misalignment can occur. For example, the fiber could be tilted with respect to the cover or its optic axis could be displaced with respect to the axis of the collimating optics. Several of the alignment errors of the fibers result in the optical beam being tilted at the wrong angle with respect to the substrate. By using the tilting capability of the two MEMS mirror, these angles can be corrected. Certain alternate designs require the fibers to be attached with a certain high precision, since the alternate designs could not compensate for the errors introduced. The present design reduces the accuracy with which the fibers need to be attached to the cover, i.e., from submicron to several microns (depends on the exact design parameters). Reduction of the required accuracy can also translate into a reduction in cost.

A primary constraint to growth of fiber optic communications is cost, particularly in single mode systems. Component cost is a significant part of the system cost. Most single mode fiber optic components are supplied with the fibers attached and precisely aligned to an optical device in a package. During component assembly, the fibers are typically aligned, then tacked in place with a UV cured epoxy. The epoxy is later heat cured. This assembly process is usually manual and tedious. As a result of these factors, the yield of assembled fiber optic components can be low and the costs are invariably high. With certain embodiments of the invention, since the required accuracy is reduced, it would be much easier to develop a system to automate the procedure, which is an enormous advantage.

Since the mirrors can be tilted so as to compensate for unwanted beam tilt, it follows that they could also be tilted in a controlled manner to introduce a certain amount of loss if so desired. This would find application in other products such a variable optical attenuators (VOA). Therefore, various aspects of the present invention have more applications than only that of optical switching.

Another advantage of the present invention arises from the principles embodied in this package/fiber assembly design. These principles can be applied to a wide range of optical devices, which have tilting mirrors. These mirrors will provide the functionality of that product (e.g., switch, VOA, etc.) as well as compensate for fiber misalignment. This creates the basis for a standard optical package technology. When used in several products, standard products benefit from higher production volumes, with consequent reductions in material, process and test equipment costs.

There exists yet another advantage of this invention. To maximize yield and quality at minimal cost, good manufacturing practice often involves building modules that are later assembled into final products. Some preferred embodiments of the present invention enable modularity. For example, fibers can be aligned and attached to lids as a sub-module, or aligned and attached after the lid is sealed to the ceramic base that contains the optical device.

All movable mirrors on the substrate can be controlled independently in order to direct optical signals from the first set of mirrors to the second set of mirrors and from the second set of mirrors to the output lenses. Specifically, the movable mirrors must be positioned at different angles in order to switch optical signals from the input fibers to the output fibers. Therefore, the optical switch typically includes control logic for controlling and positioning the movable mirrors. Among other things, the control logic determines the desired position for each movable mirror and generates the appropriate electronic signals to place each movable mirror in its desired position.

FIG. 11 is a block diagram showing the relevant components of an exemplary optical switch 1100. Among other things, the optical switch 1100 includes various optical components 1120 and control logic 1140. The optical components 1120 typically include various fiber collimators and mirrors for switching optical signals from input fibers 1110 to output fibers 1130. The control logic 1140 typically includes logic for determining the desired position for each movable mirror in the optical components 1120 and for sending appropriate electronic signals to the optical components 1120 to place each movable mirror in its desired position.

The control logic 1140 may be embodied in many different forms, including, but in no way limited to, computer program logic for use with a processor (e.g., a microprocessor, microcontroller, digital signal processor, or general purpose computer), programmable logic for use with a programmable logic device (e.g., a Field Programmable Gate Array (FPGA) or other PLD), discrete components, integrated circuitry (e.g., an Application Specific Integrated Circuit (ASIC)), or any other means including any combination thereof.

Computer program logic implementing all or part of the control logic 1140 may be embodied in various forms, including, but in no way limited to, a source code form, a computer executable form, and various intermediate forms (e.g., forms generated by an assembler, compiler, linker, or locator). Source code may include a series of computer program instructions implemented in any of various programming languages (e.g., an object code, an assembly language, or a high-level language such as Fortran, C, C++, JAVA, or HTML) for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

The computer program may be fixed in any form (e.g., source code form, computer executable form, or an intermediate form) either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), a PC card (e.g., PCMCIA card), or other memory device. The computer program may be fixed in any form in a signal that is transmittable to a computer using any of various communication technologies, including, but in no way limited to, analog technologies, digital technologies, optical technologies, wireless technologies (e.g., Bluetooth), networking technologies, and internetworking technologies. The computer program may be distributed in any form as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

Hardware logic (including programmable logic for use with a programmable logic device) implementing all or part of the control logic 1140 may be designed using traditional manual methods, or may be designed, captured, simulated, or documented electronically using various tools, such as Computer Aided Design (CAD), a hardware description language (e.g., VHDL or AHDL), or a PLD programming language (e.g., PALASM, ABEL, or CUPL).

Programmable logic may be fixed either permanently or transitorily in a tangible storage medium, such as a semiconductor memory device (e.g., a RAM, ROM, PROM, EEPROM, or Flash-Programmable RAM), a magnetic memory device (e.g., a diskette or fixed disk), an optical memory device (e.g., a CD-ROM), or other memory device. The programmable logic may be fixed in a signal that is transmittable to a computer using any of various communication technologies, including, but in no way limited to, analog technologies, digital technologies, optical technologies, wireless technologies (e.g., Bluetooth), networking technologies, and internetworking technologies.

The programmable logic may be distributed as a removable storage medium with accompanying printed or electronic documentation (e.g., shrink wrapped software), preloaded with a computer system (e.g., on system ROM or fixed disk), or distributed from a server or electronic bulletin board over the communication system (e.g., the Internet or World Wide Web).

The present invention may be embodied in other specific forms without departing from the true scope of the invention. The described embodiments are to be considered in all respects only as illustrative and not restrictive.

What is claimed is:

1. An apparatus comprising:

a cover having at least one reflector formed on one side;

a substrate having a plurality of micromachined optical mirrors formed substantially on a single plane on a side facing toward the mirrored side of the cover, the micromachined optical mirrors controllable to reflect optical signals between a plurality of optical fiber segments via the at least one reflector;

said plurality of optical fiber segments attached to the substrate so as to form an integrated package including the substrate, the cover, and the plurality of optical fiber segments.

2. The apparatus of claim 1, wherein the micromachined optical mirrors are further controllable to selectively attenuate the optical signals.

3. The apparatus of claim 1, wherein the plurality of optical fiber segments are attached using at least one of:

a fiber fusion technique;

an adhesive bonding technique;

a drilling and attachment technique;

a soldering technique; and a glass fit technique.

4. The apparatus of claim 1, wherein each optical fiber segment comprises a fiber tip and a collimating lens attached to the fiber tip.

5. The apparatus of claim 1, wherein each optical fiber segment comprises a fiber tip shaped to provide collimation.

6. The apparatus of claim 1, further comprising a plurality of collimating lenses integral to said substrate, wherein the plurality of optical fiber segments are attached in such a way that they align respectively with he plurality of collimating lenses.

7. The apparatus of claim 6, wherein the plurality of collimating lenses comprises at least one microlens array.

8. The apparatus of claim 1, wherein the substrate further comprises integrated electronics.

9. The apparatus of claim 1, wherein the integrated package is hermetically sealed.

10. The apparatus of claim 1, wherein the cover includes angled portions for directing optical signals between the optical fiber segments and the mirrors.

11. The apparatus of claim 1, wherein the cover is curved for directing optical signals between the optical fiber segments and the mirrors.

12. The apparatus of claim 1, further comprising a number of optical wedges for directing optical signals between the optical fiber segments and the mirrors via the at least one reflector.

13. The apparatus of claim 1, wherein the mirrors are further controllable to selectively attenuate the optical signals.

* * * * *

UNITED STATES PATENT AND TRADEMARK OFFICE
CERTIFICATE OF CORRECTION

PATENT NO. : 6,931,170 B2
DATED : August 16, 2005
INVENTOR(S) : Chang-Han Yun et al.

It is certified that error appears in the above-identified patent and that said Letters Patent is hereby corrected as shown below:

<u>Column 18,</u>
Line 2, replace "glass fit technique" with -- glass frit technique --.
Line 11, replace "with he plurality" with -- with the plurality --.

Signed and Sealed this

Eighth Day of November, 2005

JON W. DUDAS
*Director of the United States Patent and Trademark Office*